(12) United States Patent  
Dechant et al.

(10) Patent No.: US 8,998,341 B2
(45) Date of Patent: Apr. 7, 2015

(54) MULTI-FUNCTION DUMP CART

(71) Applicant: GTM Products, LLC, Wichita, KS (US)

(72) Inventors: Todd Francis Dechant, Wichita, KS (US); Scott Michael Timken, Bel Aire, KS (US); Todd William Showalter, Derby, KS (US)

(73) Assignee: OxCart Products, LLC, Wichita, KS (US)

( * ) Notice: Subject to any disclaimer, the term of this patent is extended or adjusted under 35 U.S.C. 154(b) by 12 days.

(21) Appl. No.: 13/838,527

(22) Filed: Mar. 15, 2013

(65) Prior Publication Data

US 2014/0001817 A1    Jan. 2, 2014

Related U.S. Application Data

(60) Provisional application No. 61/665,045, filed on Jun. 27, 2012, provisional application No. 61/665,166, filed on Jun. 27, 2012, provisional application No. 61/665,171, filed on Jun. 27, 2012.

(51) Int. Cl.
*B60P 1/16* (2006.01)
(52) U.S. Cl.
CPC ....................................... *B60P 1/16* (2013.01)
(58) Field of Classification Search
USPC .............. 298/9, 10, 17 R, 17 T, 38, 17 SG, 5; 280/479.3, 499.3, 494; 414/482, 483, 414/485
See application file for complete search history.

(56) References Cited

U.S. PATENT DOCUMENTS

| | | | | |
|---|---|---|---|---|
| 5,395,163 A | * | 3/1995 | Mandell et al. | 298/38 |
| 5,915,706 A | * | 6/1999 | Mosley | 280/47.26 |
| 6,755,478 B2 | * | 6/2004 | Messinger-Rapport | 298/3 |
| 7,134,681 B1 | * | 11/2006 | Jones | 280/651 |
| 7,665,768 B2 | * | 2/2010 | Duval | 280/789 |
| 2007/0164526 A1 | * | 7/2007 | Martini et al. | 280/47.26 |
| 2011/0049825 A1 | | 3/2011 | Martini et al. | |

OTHER PUBLICATIONS

Ohio Steel Industries; Sales Booklet; "Professional Grade Tractor Lift—TL4000"; Copyright 2011.

* cited by examiner

*Primary Examiner* — Glenn Dayoan
*Assistant Examiner* — Sunsurraye Westbrook
(74) *Attorney, Agent, or Firm* — Hovey Williams LLP

(57) ABSTRACT

A dump cart comprises a bed, a bed adapter, a frame, and a lift adapter. The bed is configured to carry a load. The bed adapter is configured to receive a bottom wall of the bed and includes a left adapter rail and a right adapter rail. The frame includes a left frame rail pivotally coupled to the left adapter rail and a right frame rail pivotally coupled to the right adapter rail. These connections allow the bed to dump the load to the rear of the dump cart. The lift adapter assists in lifting an object and includes left and right cradle arms that are configured to couple to one or more features of the object and a stabilizer leg that is configured to contact the ground so as to support a portion of the weight of the object.

26 Claims, 32 Drawing Sheets

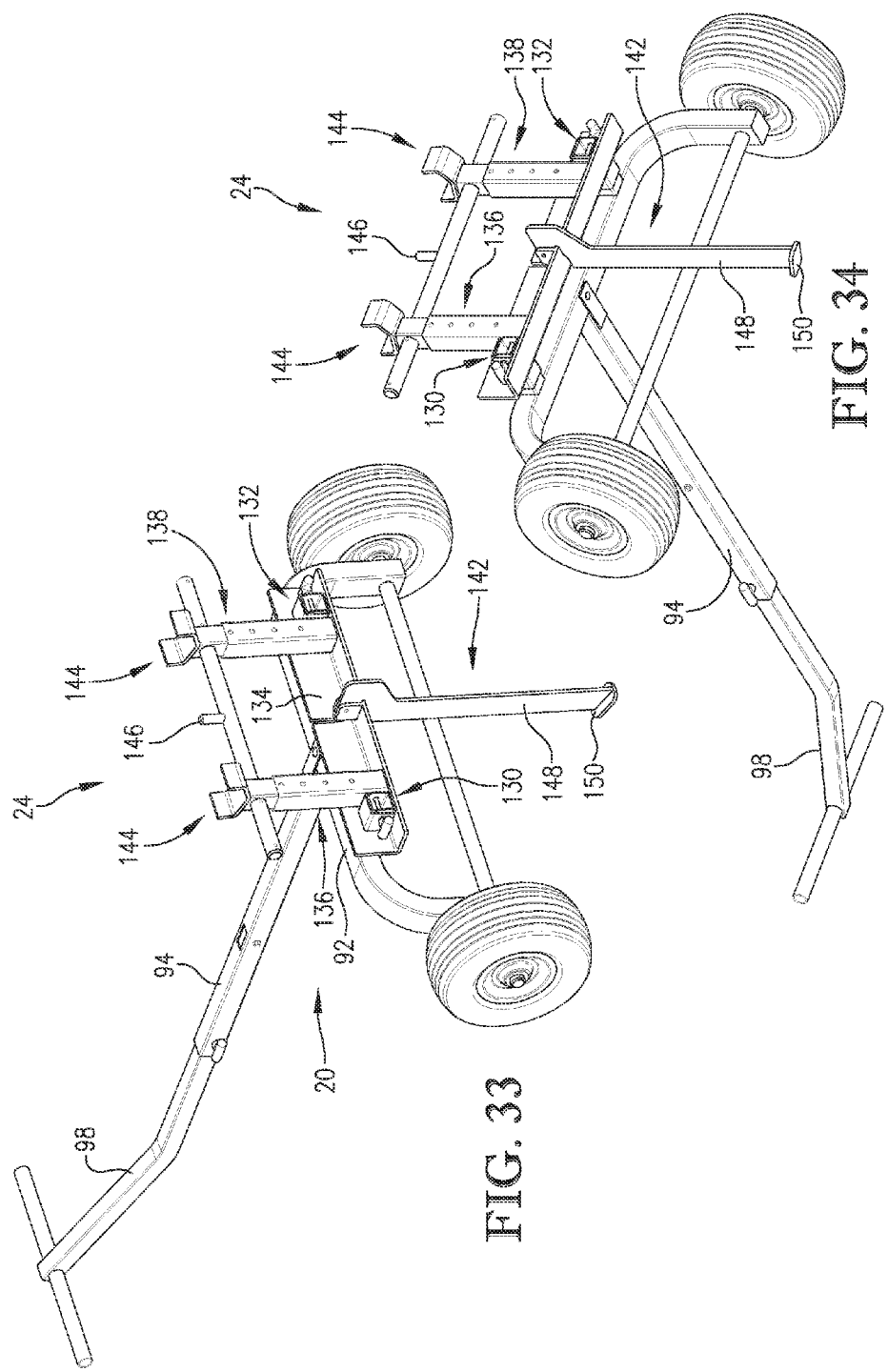

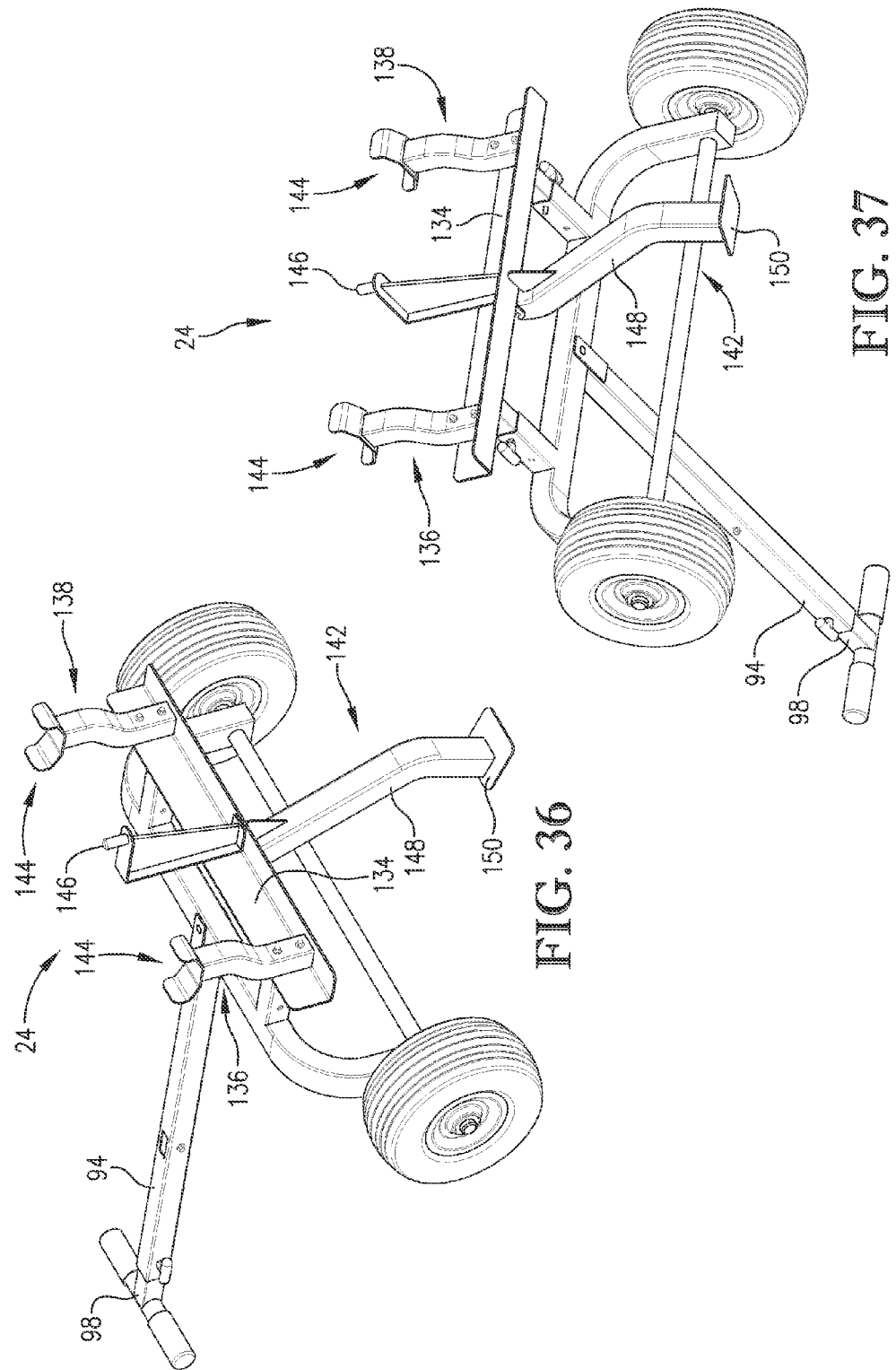

MULTI-FUNCTION DUMP CART

RELATED APPLICATIONS

The current application is a nonprovisional patent application and claims priority benefit, with regard to all common subject matter, of earlier-filed provisional patent applications: U.S. Application No. 61/665,045, titled "LAWN DUMP CART CONVERTS INTO MOWER LIFT" and filed Jun. 27, 2012; U.S. Application No. 61/665,166, titled "LAWN DUMP CART WITH GAS-ASSISTED SIDEWAY AND OFFSET-PIVOT REAR DUMP CAPABILITIES" and filed Jun. 27, 2012; and U.S. Application No. 61/665,171, titled "LAWN DUMP CART CONVERTS INTO A PORTABLE WORK SURFACE SYSTEM" and filed Jun. 27, 2012. The three listed applications are hereby incorporated by reference, in their entireties, into the current application.

BACKGROUND OF THE INVENTION

Embodiments of the current invention relate to dump carts that can perform multiple functions. Dump carts are often used in lawn and garden settings, on construction sites, or for recreational activities and are usually pulled by a lawn tractor, all-terrain vehicle, or other vehicle. Dump carts may be adapted to carry loads such as grass, leaves, dirt, gravel, or the like. Often, a dump cart can dump its load to the rear of the cart but not in any other direction. Occasionally, the vehicle pulling the dump cart, or another piece of equipment, may require repair or maintenance for which access to an underside of the vehicle is needed. For example, a blade of a lawn mower may need changing. Lifting and holding the mower in position to change the blade may be difficult without the assistance of a lift jack. Typically, the dump cart includes the basic components for lifting an object, but cannot directly do so.

SUMMARY OF THE INVENTION

Embodiments of the current invention provide a multi-function dump cart. In a first embodiment, the dump cart comprises a bed, a bed adapter, and a frame. The bed is configured to carry a load. The bed adapter is configured to receive a bottom wall of the bed and includes a left adapter rail and a right adapter rail. The frame includes a frame crossmember, a left frame ran, a right frame ran, and a center beam. The left frame rail is rigidly coupled to the frame crossmember and pivotally coupled to the left adapter rail. The right frame rail is rigidly coupled to the frame crossmember and pivotally coupled to the right adapter rail. The right frame rail in combination with left frame rail allows the bed to dump the load to the rear of the dump cart. The center beam is configured to removably couple to a pulling vehicle and pivotally couple to the frame crossmember to allow the dump cart to rotate with respect to the pulling vehicle.

In a second embodiment, the current invention provides a dump cart comprising a bed, a bed adapter, a secondary bed adapter, and a frame. The bed is configured to carry a load. The bed adapter includes a left adapter rail and a right adapter ran. The secondary bed adapter is rigidly coupled to a bottom wall of the bed and pivotally coupled to only one of either the left adapter rail or the right adapter rail to allow the bed to pivot sideways with respect to the bed adapter. The frame includes a frame crossmember, a left frame rail, a right frame rail, and a center beam. The left frame rail is rigidly coupled to the frame crossmember and pivotally coupled to the left adapter rail. The right frame rail is rigidly coupled to the frame crossmember and pivotally coupled to the right adapter rail. The right frame rail in combination with left frame rail allows the bed to dump the load to the rear of the dump cart. The center beam is configured to removably couple to a pulling vehicle and pivotally couple to the frame crossmember to allow the dump cart to rotate with respect to the pulling vehicle.

In a third embodiment, the current invention provides a dump cart comprising a bed, a bed adapter, a frame, and a lift adapter. The bed is configured to carry a load. The bed adapter is configured to receive a bottom wall of the bed and includes a left adapter rail and a right adapter rail. The frame includes a frame crossmember, a left frame rail, a right frame rail, and a center beam. The left frame rail is releasably coupled to the left adapter rail, and the right frame rail is releasably coupled to the right adapter rail. The center beam is rigidly coupled to the frame crossmember and configured to removably couple to a pulling vehicle. The lift adapter assists in lifting an object and includes a lift arm, a left cradle arm, a right cradle arm, and a stabilizer leg. The lift arm is configured to releasably couple to the center beam for a user to grip while lifting the object. The left and right cradle arms are configured to couple to one or more features of the object. The stabilizer leg that is configured to contact the ground so as to support a portion of the weight of the object.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 33 is a top, rear perspective view of the frame and the lift adapter;

FIG. 34 is a bottom, rear perspective view of the frame and the lift adapter;

FIG. 36 is a top, rear perspective view of the frame and the alternative embodiment of the lift adapter;

FIG. 37 is a bottom, rear perspective view of the frame and the alternative embodiment of the lift adapter;

Figure 1:
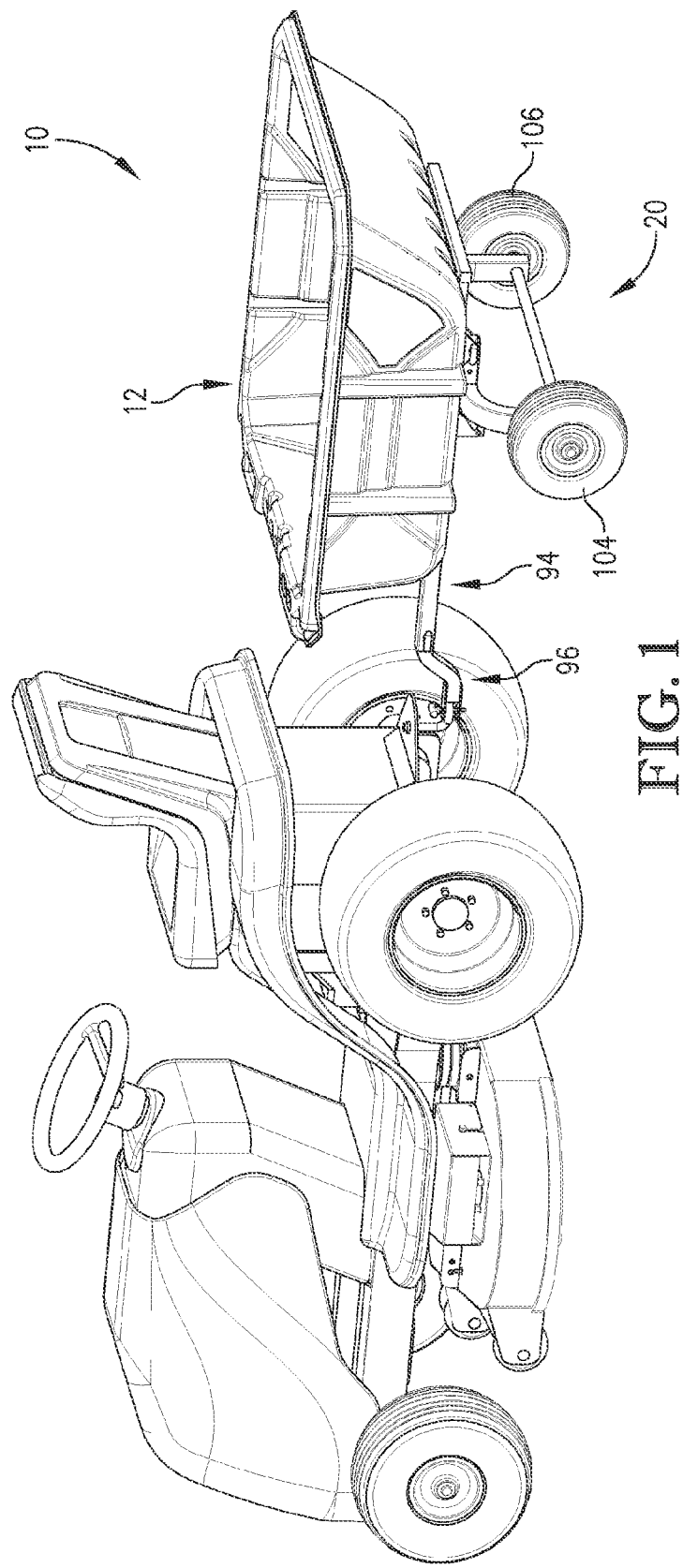
FIG. 1 is a rear perspective view of a dump cart, constructed in accordance with various embodiments of the current invention, being pulled by a tractor.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
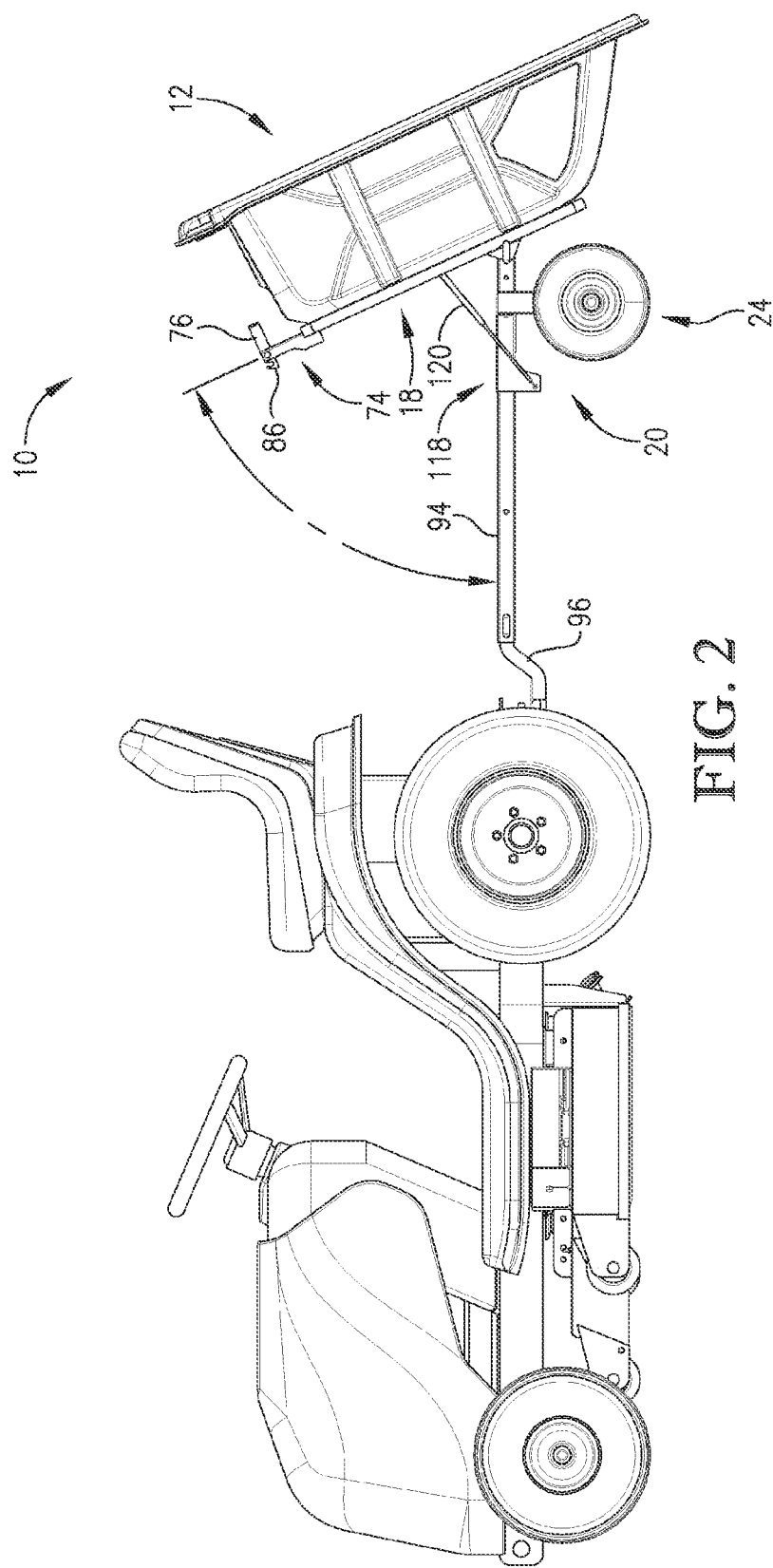
FIG. 2 is a side view of the dump cart being pulled by the tractor.

A dump cart 10, constructed in accordance with various embodiments of the current invention, is shown in FIGS. 1-41 and broadly comprises a bed 12, a plurality of panels 14, a plurality of bars 16, a bed adapter 18, a frame 20, at least two wheels 22, and a lift adapter 24. The dump cart 10 is typically pulled by a vehicle or tractor, as seen in FIGS. 1-2, and may be utilized to lift the vehicle should the vehicle require service or maintenance.

The terms "front", "forward", "rear", and "rearward" may used throughout this specification to indicate directions relative to the dump cart 10, wherein front and forward indicate a direction toward the pulling vehicle, while rear and rearward indicate a direction away from the pulling vehicle.

The bed 12 may retain a load that is eventually dumped and may be generally concave with an inner surface that receives the load. The bed 12 may have a tank, tub, or box shape with a left sidewall 26, a right sidewall 28, a forward wall 30, a rear wall 32, a bottom wall 34, and a forward ledge 36. Some embodiments of the bed 12 may further include a plurality of ridges 38, as best seen in FIGS. 4-7, positioned on the bottom wall 34. The ridges 38 may be spaced-apart, parallel to one another, and oriented along the longitudinal axis. The rear wall 32 may be sloped or curved and extend rearward from the bottom wall 34 in order to make dumping the load easier. Accordingly, the left sidewall 26 and the right sidewall 28 may each have a rear edge that is sloped or angled to intersect the rear wall 32.

Figure 5:
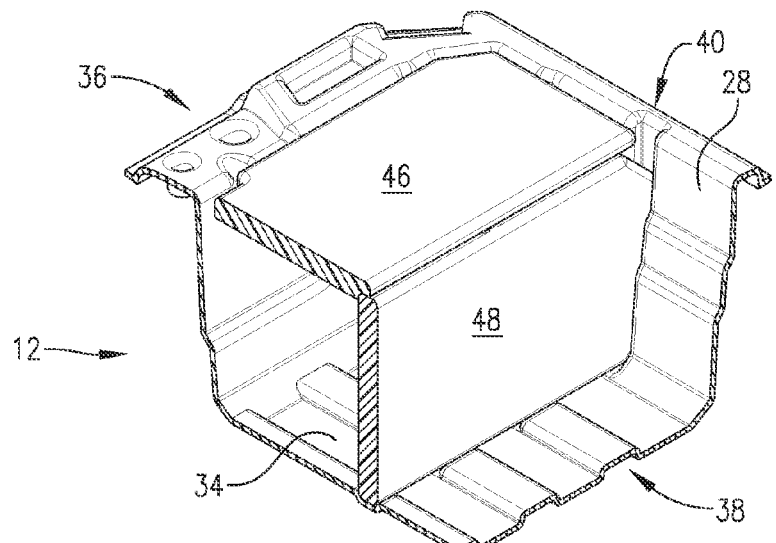
FIG. 5 is a perspective view of a portion of the bed and the first and second panels.
Figure 6:
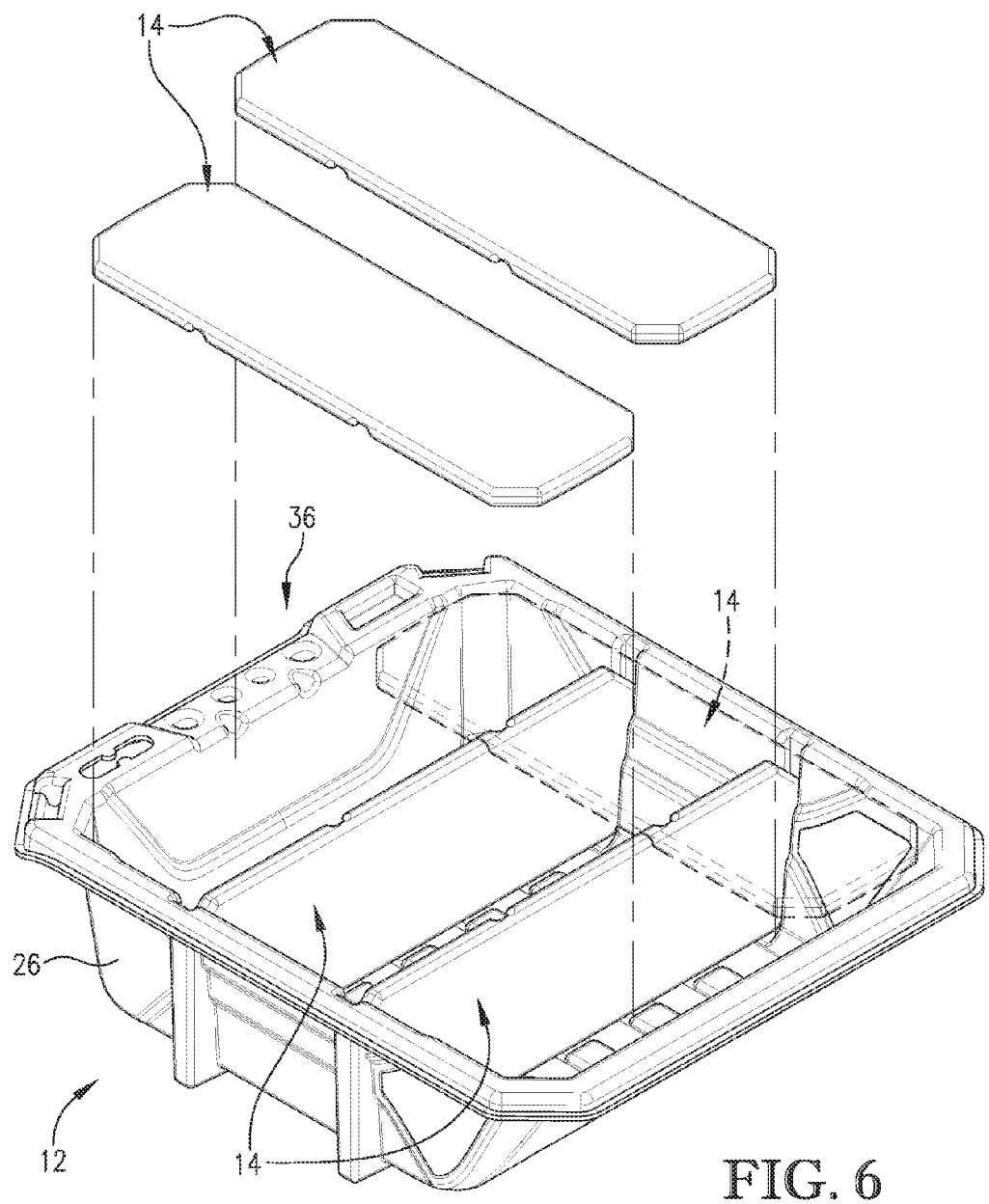
FIG. 6 is a top perspective view of the bed with a plurality of panels.
Figure 7:
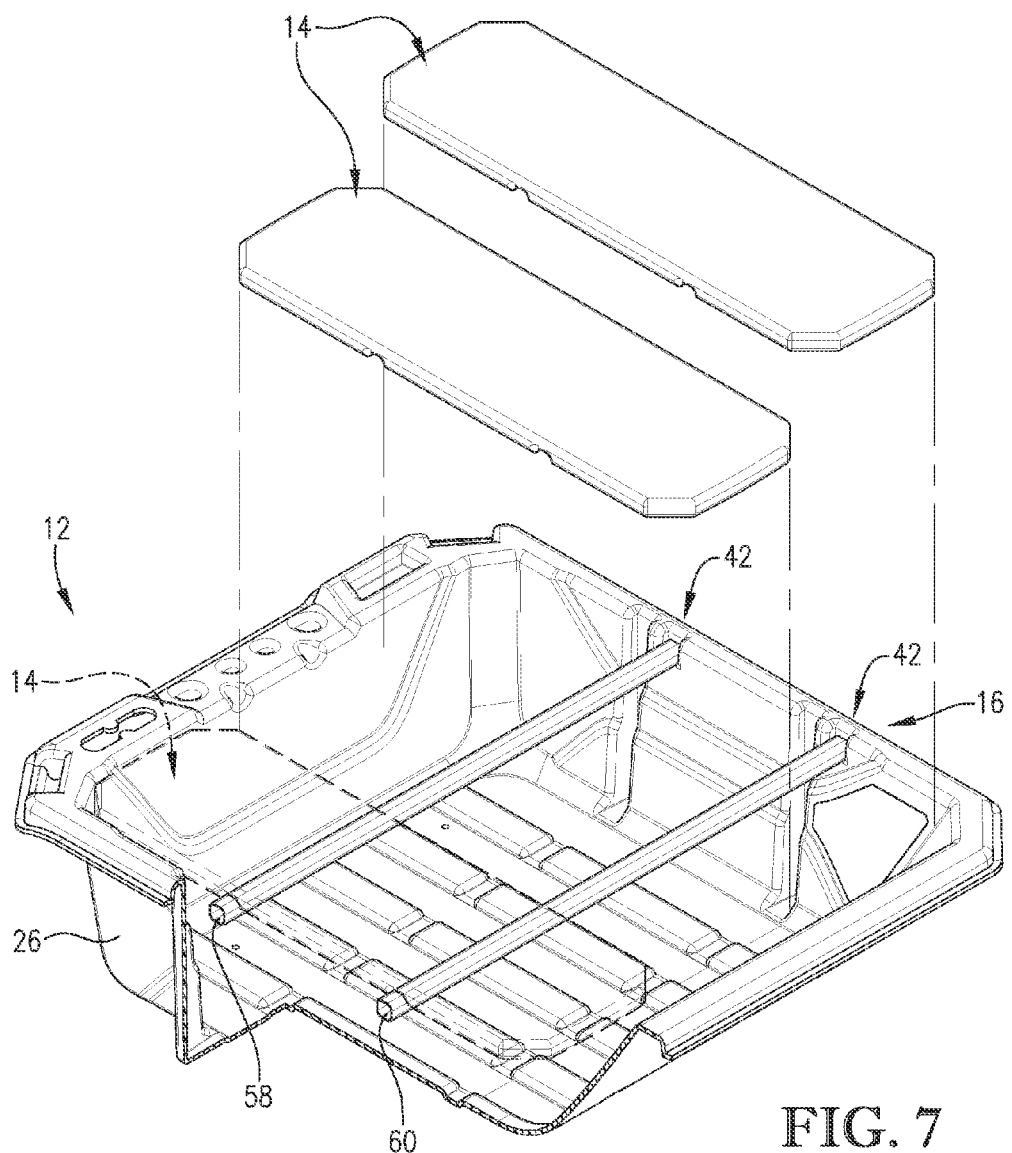
FIG. 7 is a top perspective view of the bed, with a portion of a sidewall cutaway, including a plurality of panels and first and second bars.
Figure 8:
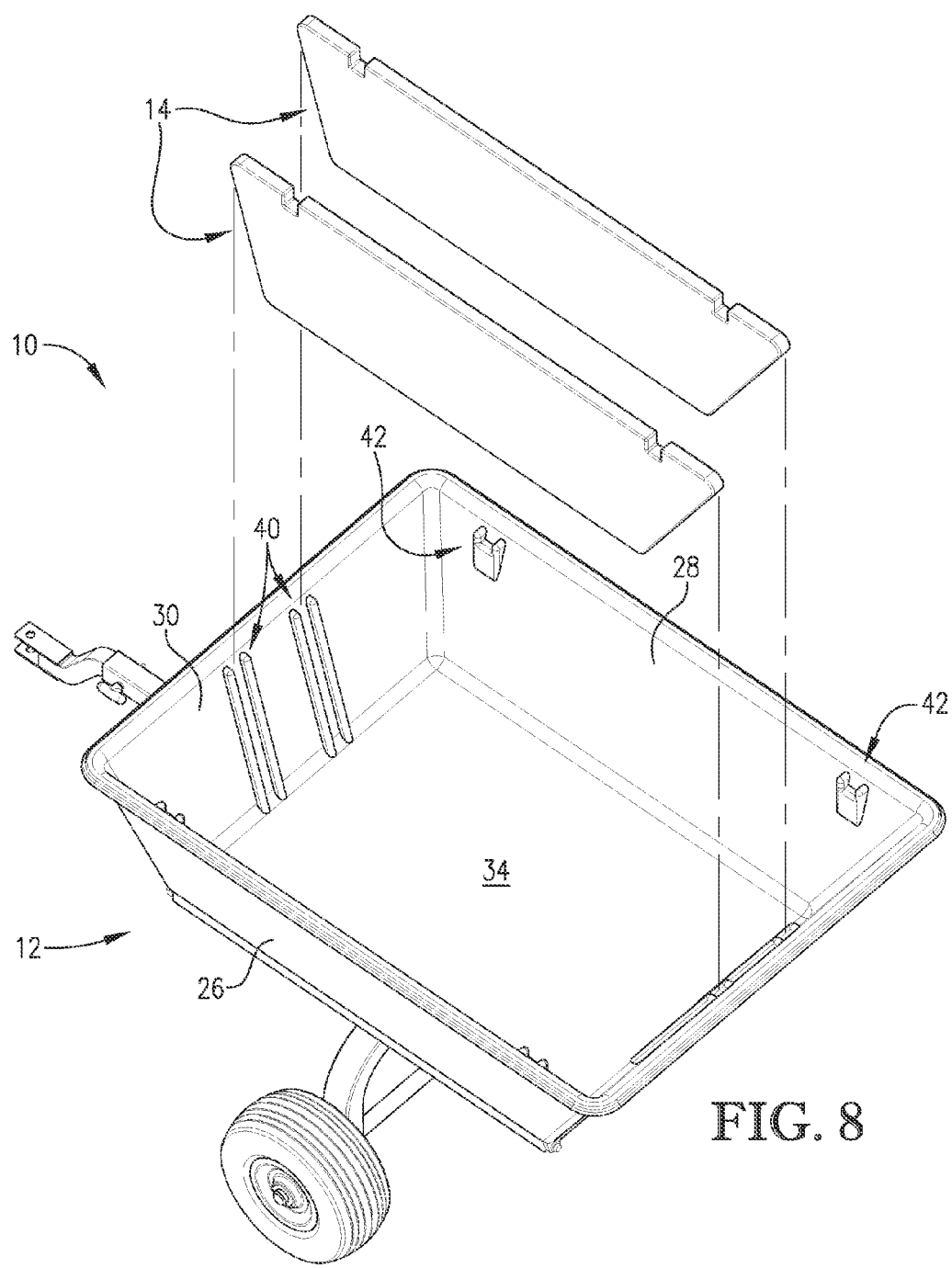
FIG. 8 is a top perspective view of an alternative embodiment of the bed including first and second panels.
Figure 9:
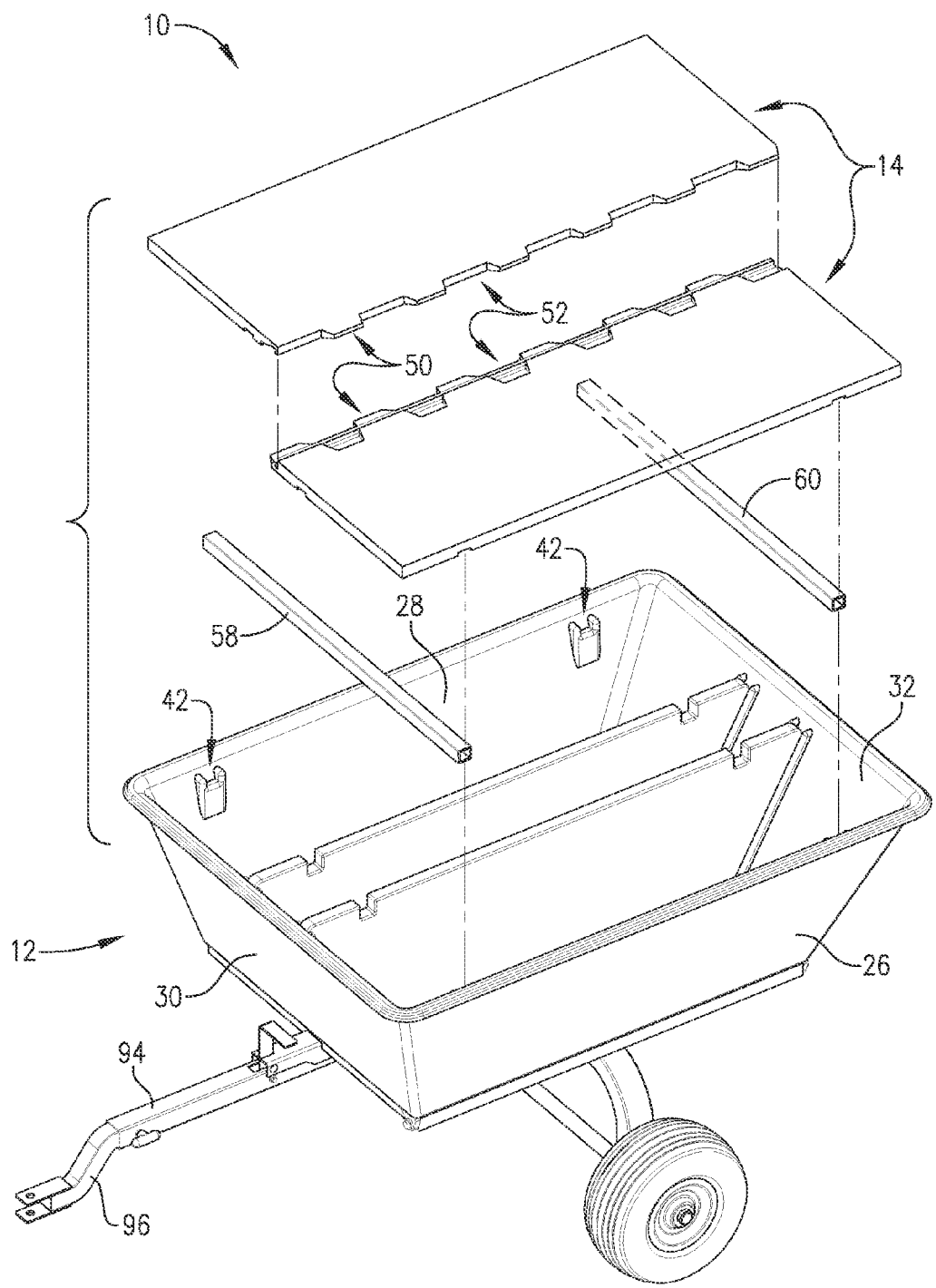
FIG. 9 is a top perspective view of the alternative embodiment of the bed including first and second bars and panels that lock together.

The bed 12 may also include a plurality of vertically-oriented grooves 40 in the walls thereof. In some embodiments, the grooves 40 may be positioned along the left sidewall 26 and the right sidewall 28, as best seen in FIGS. 4-7. In other embodiments, the grooves 40 may be positioned along the forward wall 30 and the rear wall 32, as best seen in FIGS. 8-9. The grooves 40 extend from the upper edge to the lower edge of the sidewalls 26, 28, 30, 32, and each groove 40 may retain a panel 14. In addition, the bed 12 may include a plurality of slots 42 that are positioned along the left sidewall 26 and the right sidewall 28, as seen in FIGS. 7 and 9. The slots 42 extend from the upper edge of the sidewalls 26, 28, 30, 32 downward a short distance and each slot 42 is configured to retain a bar 16.

The forward ledge 36, as best seen in FIGS. 4-7, may include openings, passthroughs, slots, trays, cups, handles, or the like, or combinations thereof. The forward ledge 36 may be used for storing or retaining tools, parts, supplies, or the like, or combinations thereof. The forward ledge 36 may also be utilized to push, pull, or lift the bed 12 or the dump cart 10.

Figure 10:
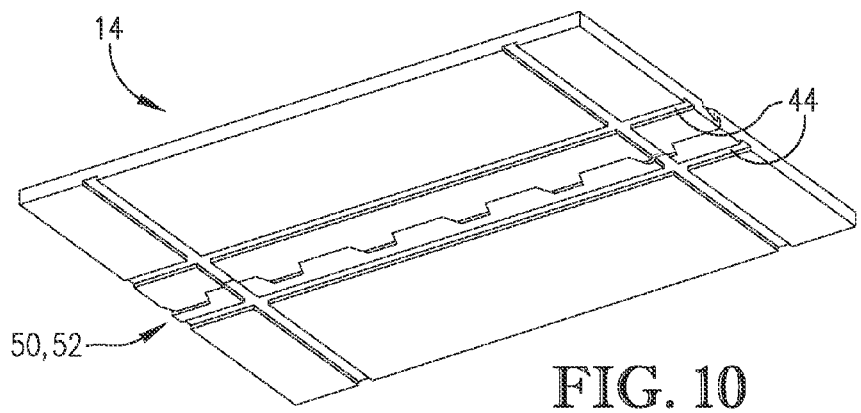
FIG. 10 is a perspective view of two panels that lock together.
Figure 11:
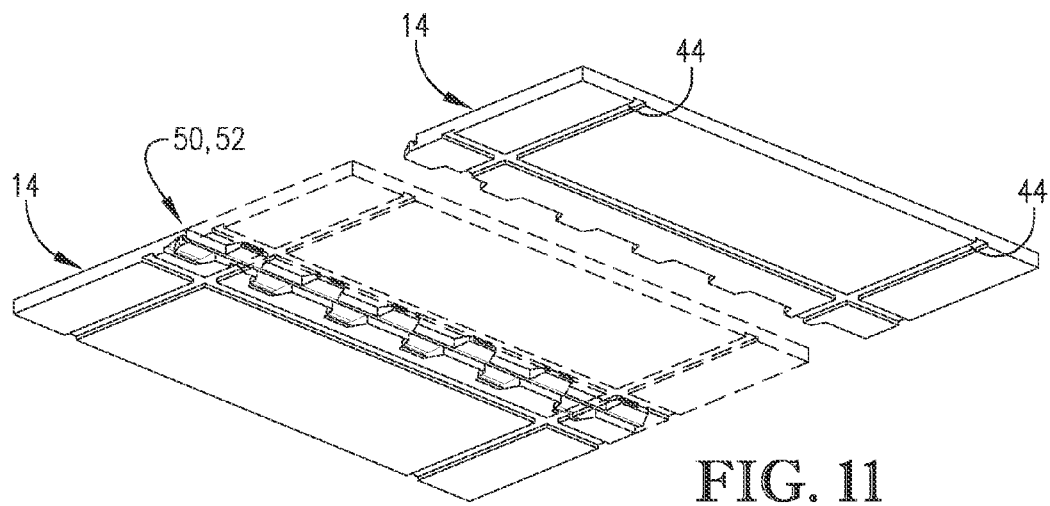
FIG. 11 is a perspective view of two panels that lock together shown both locked and separated.
Figure 12:
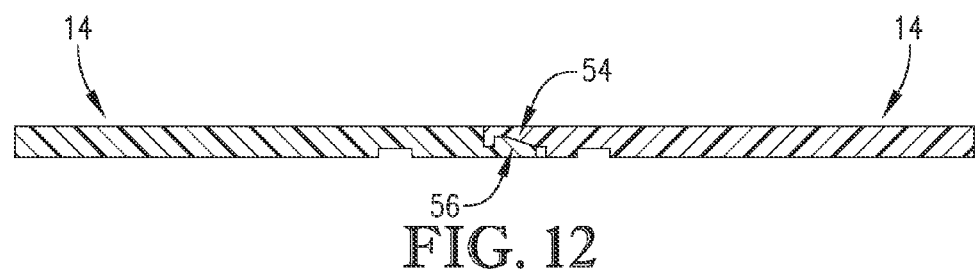
FIG. 12 is a side sectional view of two panels that lock together.

The panels 14, as seen in FIGS. 4-14, generally have a board-like shape with a length roughly equal to the distance between the left sidewall 26 and the right sidewall 28 and a width roughly equal to the depth of the bed 12. Each panel 14 may also include one or more widthwise or lengthwise channels 44, as seen in FIGS. 10-12, positioned on one of the major surfaces, such as the top or the bottom surface. In various embodiments of the dump cart 10, there may be at least a first panel 46 and a second panel 48 wherein the first panel 46 may be positioned in the forward groove 40 and the second panel 48 may be positioned in the rear groove 40 to create separate compartments within the bed 12.

In some embodiments, the first panel 46 and the second panel 48 may each include a plurality of interlocking tabs 50, as seen in FIGS. 9-13, along one of the lengthwise sides that allow the two panels 14 to couple together to form one large panel. The tabs 50 are spaced apart with a space 52 positioned between each pair of adjacent tabs 50. In addition, the tabs 50 on the first panel 46 are positioned to complement the tabs 50 on the second panel 48, such that the tabs 50 of the first panel 46 fit into the spaces 52 of the second panel 48 when the two panels 14 are joined together. Furthermore, each tab 50 may include a downward-protruding first latch 54, while each space 52 may include an upward-protruding second latch 56. When the first panel 46 is joined to the second panel 48, the first latch 54 may lock in the second latch 56.

Figure 4:
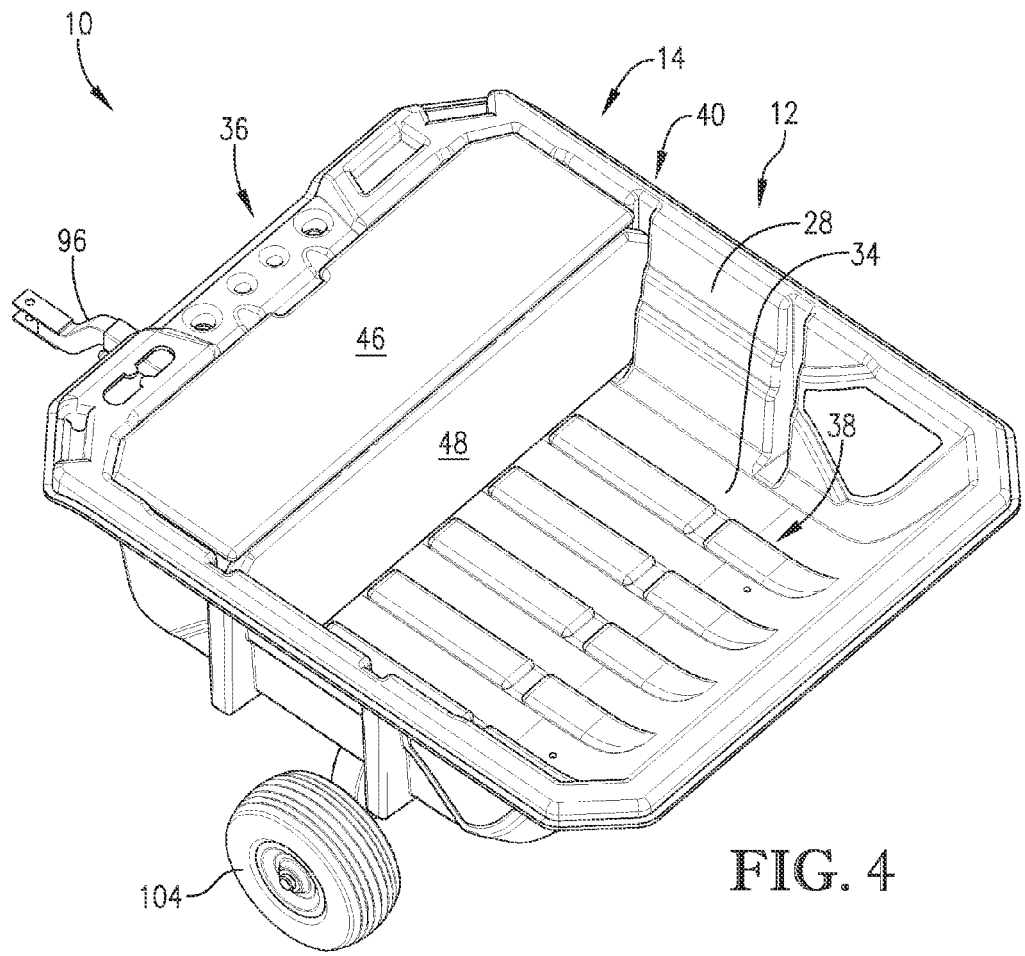
FIG. 4 is a top perspective view of the dump cart including a bed with first and second panels.

In certain embodiments, the first panel 46 and the second panel 48 may further include one or more interlocking snap-in, living hinges along one of the lengthwise sides that allow the two panels 14 to rotatably couple together. The first panel 46 may include a first part of the hinge, while the second panel 48 includes a complementary second part of the hinge, so that the panels 14 may be joined with the first part of the hinge rotatably coupling to the second part of the hinge. The first panel 46 and the second panel 48 in combination with the sidewalls 26, 28, 30 may form a toolbox when implemented as shown in FIGS. 4-5. The first panel 46 may act as a hinged lid, which may be opened and closed, as desired.

The bars 16, as shown in FIGS. 7 and 9, are generally elongated with a length roughly equal to the distance between the left sidewall 26 and the right sidewall 28 and a width roughly equal to the width of either slot 42. In various embodiments, the dump cart 10 may include a first bar 58 to be positioned in the forward slot 42 and a second bar 60 to be positioned in the rear slot 42.

Figure 13:
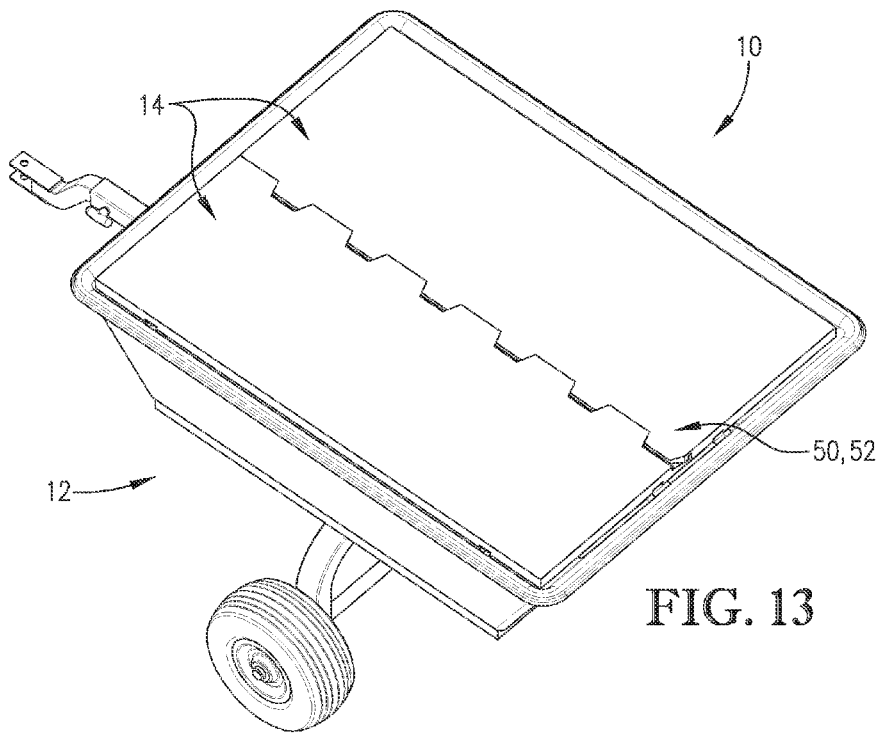
FIG. 13 is a top perspective view of the dump cart with the two panels that lock together forming a work surface.
Figure 14:
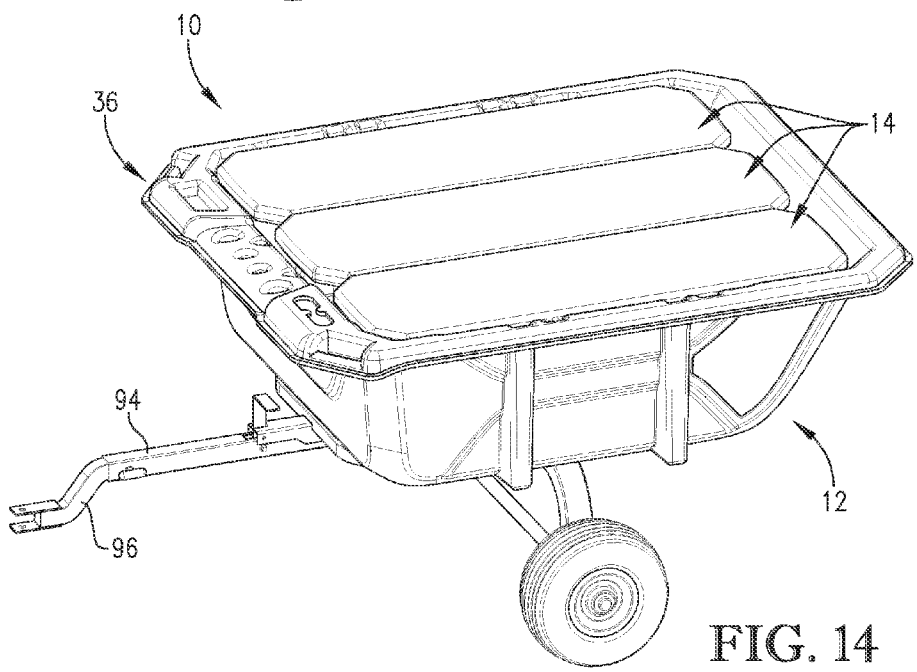
FIG. 14 is a top perspective view of the dump cart with a plurality of panels placed together to form a work surface.

The panels 14 utilized in combination with the bars 16 may form a work surface along the top edge of the bed 12, as shown in FIGS. 13-14. In a first arrangement, the bars 16 may be positioned in the slots 42 and the panels 14 may be placed thereon such that the lengthwise edges extend from the front to the rear of the bed 12. The bars 16 may fit in the widthwise channels 44 of the panels 14. The panels 14 may be separated to include a space therebetween, or they may abut one another. If the panels 14 include the interlocking tabs 50 and spaces 52, then the panels 14 may be coupled to one another such that the first latches 54 lock in the second latches 56. In a second arrangement, the panels 14 may be placed crosswise on the bed 12, such that the lengthwise edges of the panels 14 extend from the left sidewall 26 to the right sidewall 28. The panels 14 may or may not abut or interlock with one another.

Figure 15:
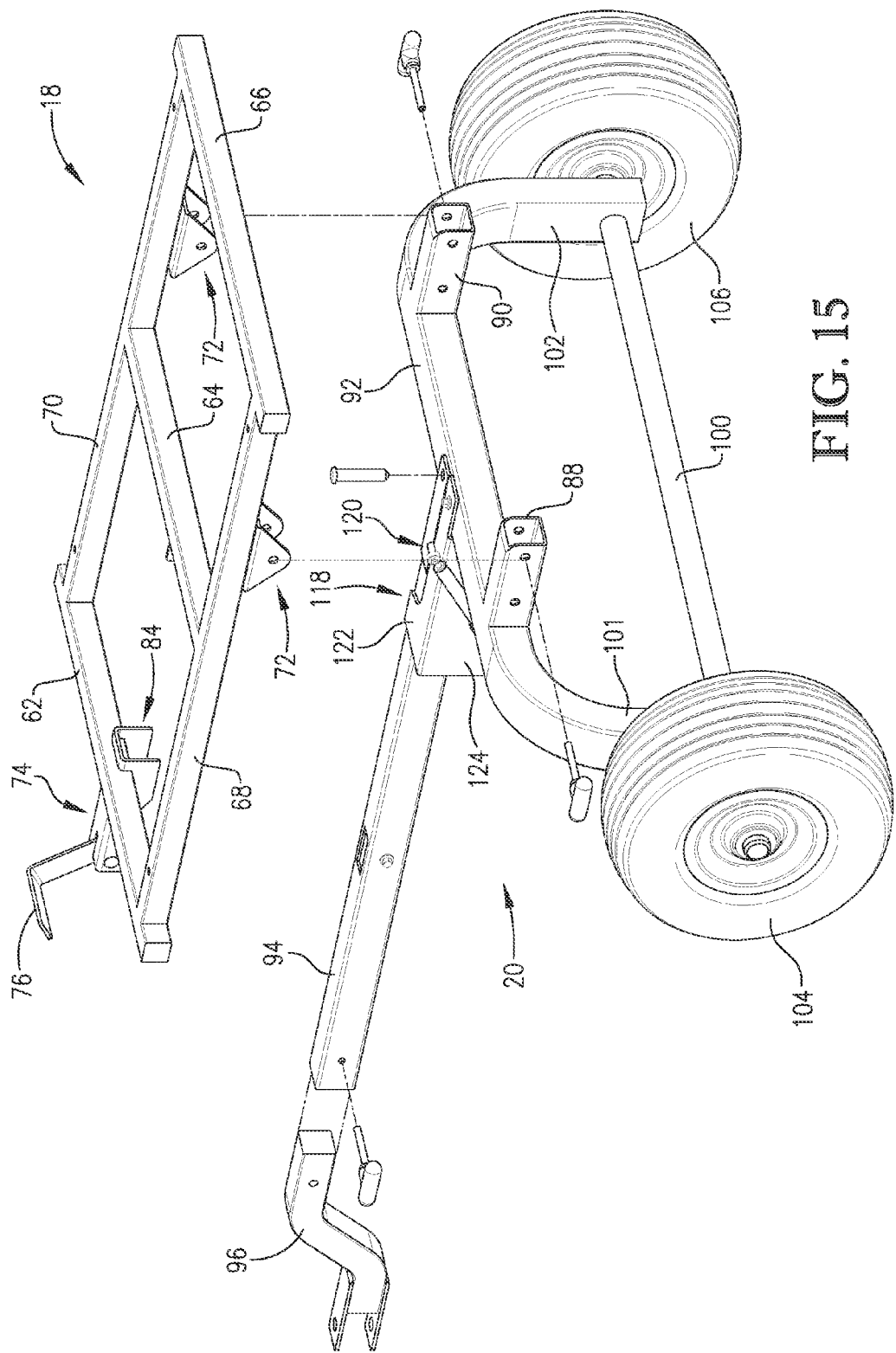
FIG. 15 is a partially exploded perspective view of a bed adapter and a frame of the dump cart.
Figure 16:
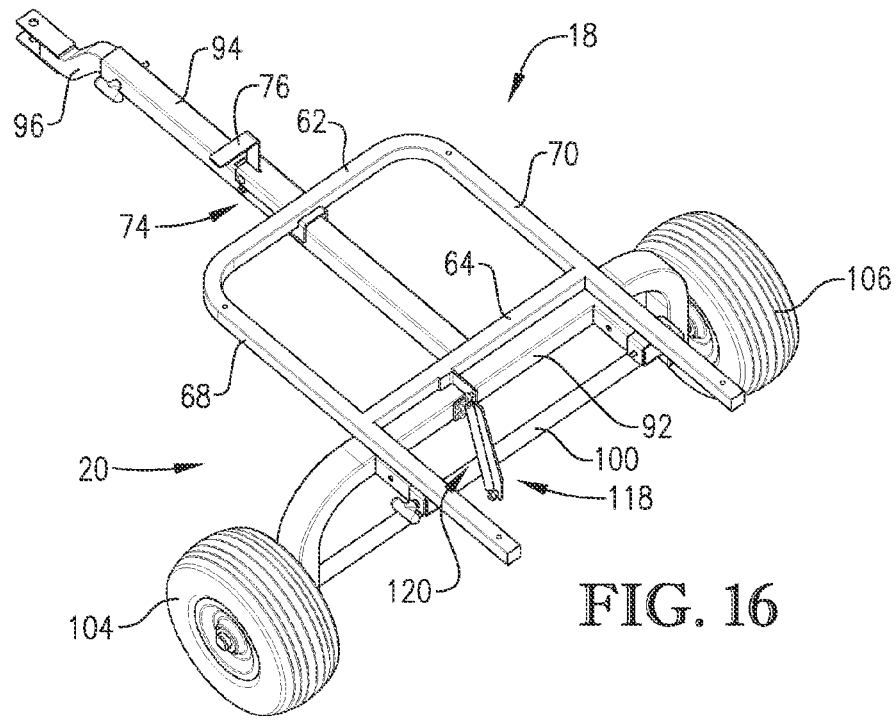
FIG. 16 is a top perspective view of the frame and an alternative embodiment of the bed adapter.

The bed adapter 18 generally couples the bed 12 to the frame 20 and may include a forward adapter crossmember 62, a first center adapter crossmember 64, a rear adapter crossmember 66, a left adapter rail 68, a right adapter rail 70, a plurality of adapter hinges 72, a bed handle bracket 74, and a bed handle 76. The forward adapter crossmember 62, the left adapter rail 68, and the right adapter rail 70 are generally connected together in an orthogonal fashion. In some embodiments, the forward adapter crossmember 62, the left adapter rail 68, and the right adapter rail 70 are generally straight and are separate components, as best seen in FIG. 15. In other embodiments, the forward adapter crossmember 62, the left adapter rail 68, and the right adapter rail 70 may be formed from a single bar that is bent to form "U" shape, as best seen in FIG. 16. The first center adapter crossmember 64 may connect to the left adapter rail 68 and the right adapter rail 70 about midway along their length, while the rear adapter crossmember 66 generally couples to the rear of the adapter rails 68, 70. The forward adapter crossmember 62, the first center adapter crossmember 64, the rear adapter crossmember 66, the left adapter rail 68, and the right adapter rail 70 may have a box cross-sectional shape, although shapes of a "C", an "I", an "L", a "T", a hat, or the like, or combinations thereof are also possible. The bottom wall 34 of the bed 12 may connect to an upper surface of the left and right adapter rails 68, 70 with screws or other fasteners. The adapter hinges 72 may be positioned on a lower surface of the left adapter rail 68 and the right adapter rail 70 and may allow the bed adapter 18 to pivotally and removably connect to the frame 20, as described in more detail below. In some embodiments, the adapter hinges 72 may be connected to the frame 20 with releasable pins. The adapter hinges 72 allow the bed 12 and the bed adapter 18 to pivot to the rear in order to dump the load from the bed 12 to the rear of the dump cart 10.

Figure 17:
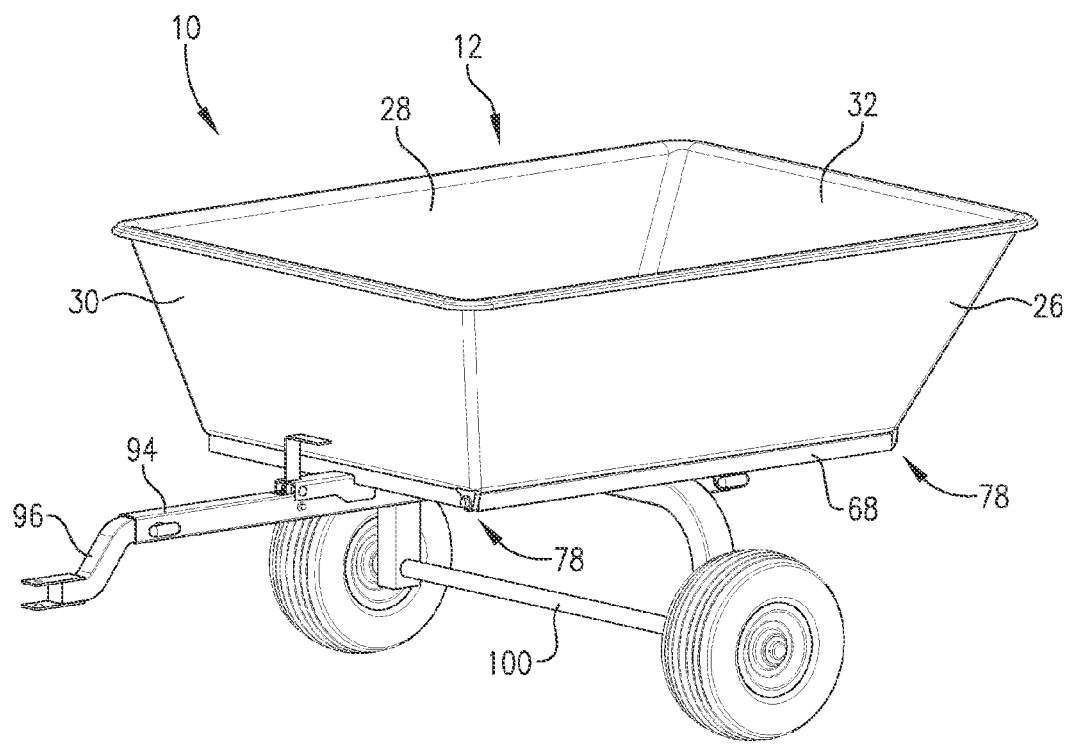
FIG. 17 is a forward perspective view of the dump cart.
Figure 18:
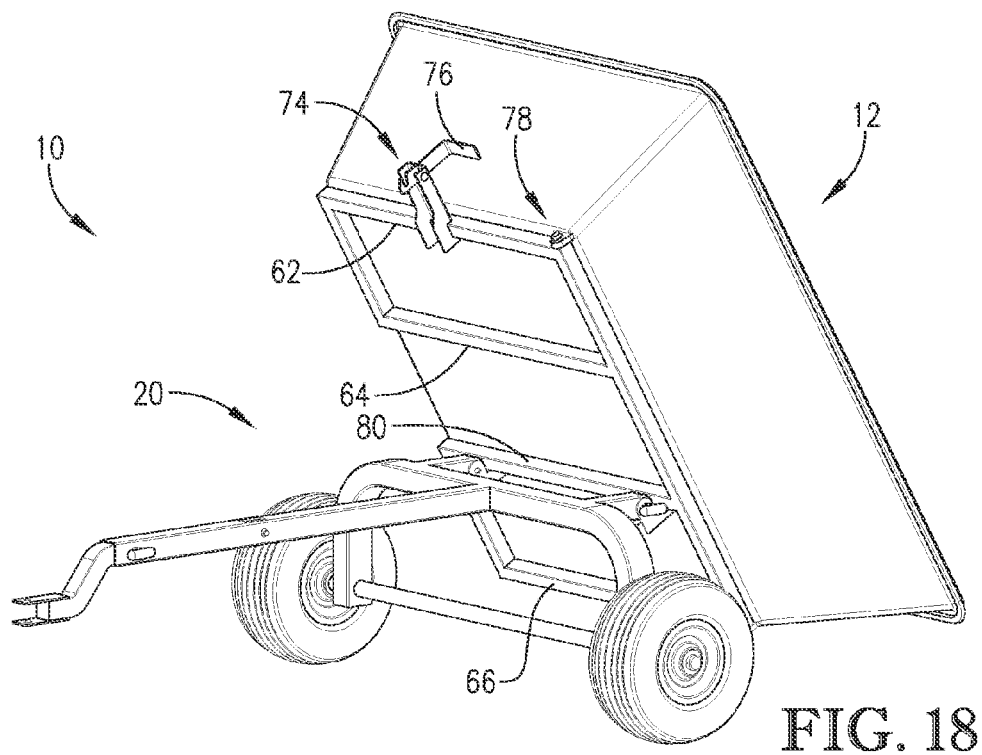
FIG. 18 is a forward perspective view of the dump cart with an alternative embodiment of the bed adapter dumping a load to the rear of the cart.
Figure 19:
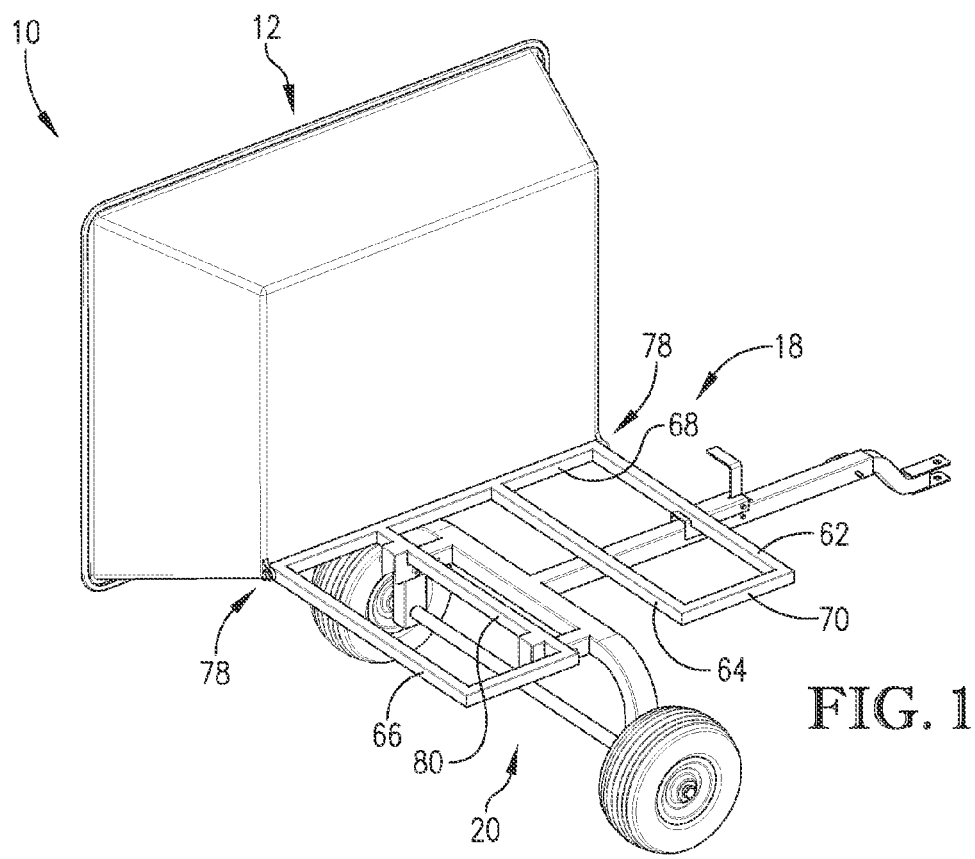
FIG. 19 is a forward perspective view of the dump cart with the alternative embodiment of the bed adapter dumping a load to the side of the cart.
Figure 20:
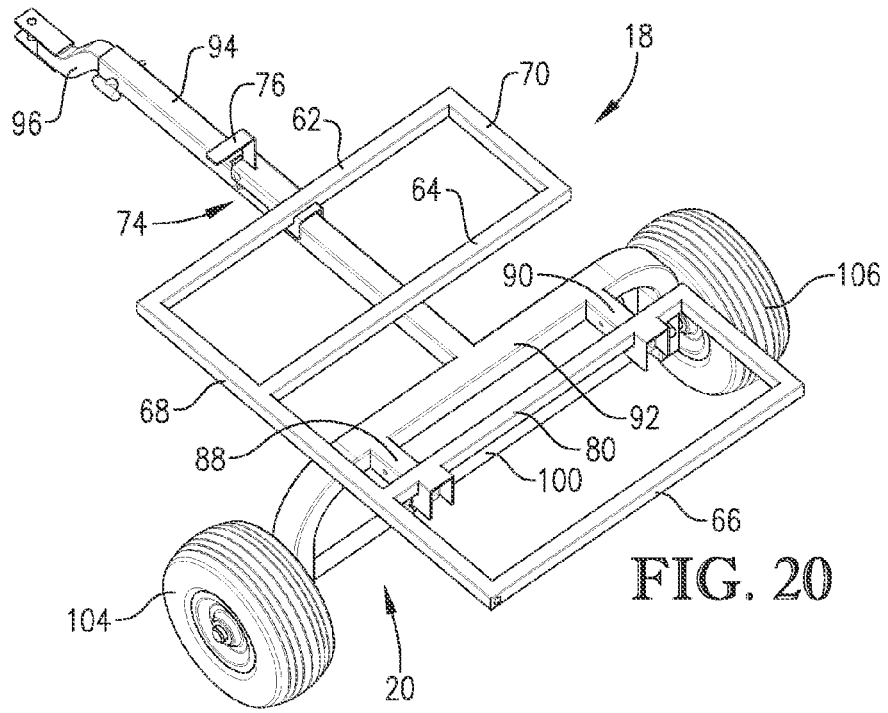
FIG. 20 is a top perspective view of the frame and the alternative embodiment of the bed adapter.
Figure 21:
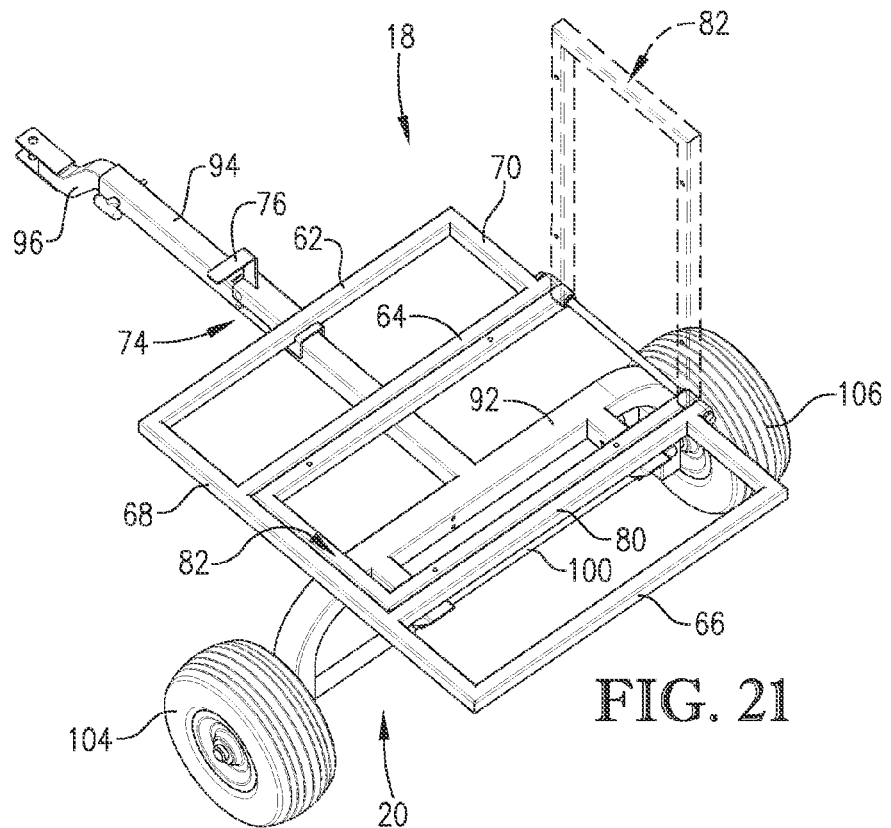
FIG. 21 is a top perspective view of the frame, the bed adapter, and a secondary bed adapter.

In various embodiments, the bed 12 is further configured to pivot sideways with respect to the bed adapter 18. In some embodiments, the bed 12 may include bed hinges 78 that are positioned on the bottom wall 34 aligned with the opposing ends of either the left sidewall 26 or the right sidewall 28, as shown in FIGS. 17-19. The bed hinges 78 pivotally connect to the opposing ends of either the left adapter rail 68 or the right adapter rail 70 to allow the bed 12 to pivot either to the left side or the right side. In other embodiments, either the left adapter rail 68 or the right adapter rail 70 includes a gap that separates the rail into two pieces. The bed adapter 18 may further include a second center adapter crossmember 80, wherein the first and second center adapter crossmembers 64, 80 couple to the rails 68, 70 at the ends of the gap, as shown in FIG. 20. The bed adapter 18 may include a secondary adapter 82 with a general U shape that attaches to the bottom wall 34 of the bed 12, as shown in FIGS. 20-24. The ends of the secondary adapter 82 may pivotally connect to either the left adapter rail 68 or the right adapter rail 70 in the gap to allow the bed 12 and the secondary adapter 82 to pivot either to the left side or the right side. Thus, for certain embodiments, the bed 12 or the bed in combination with a portion of the bed adapter 18 may pivot to the left side or the right side in order to dump the load from the bed 12 to either side of the dump cart 10.

Figure 3:
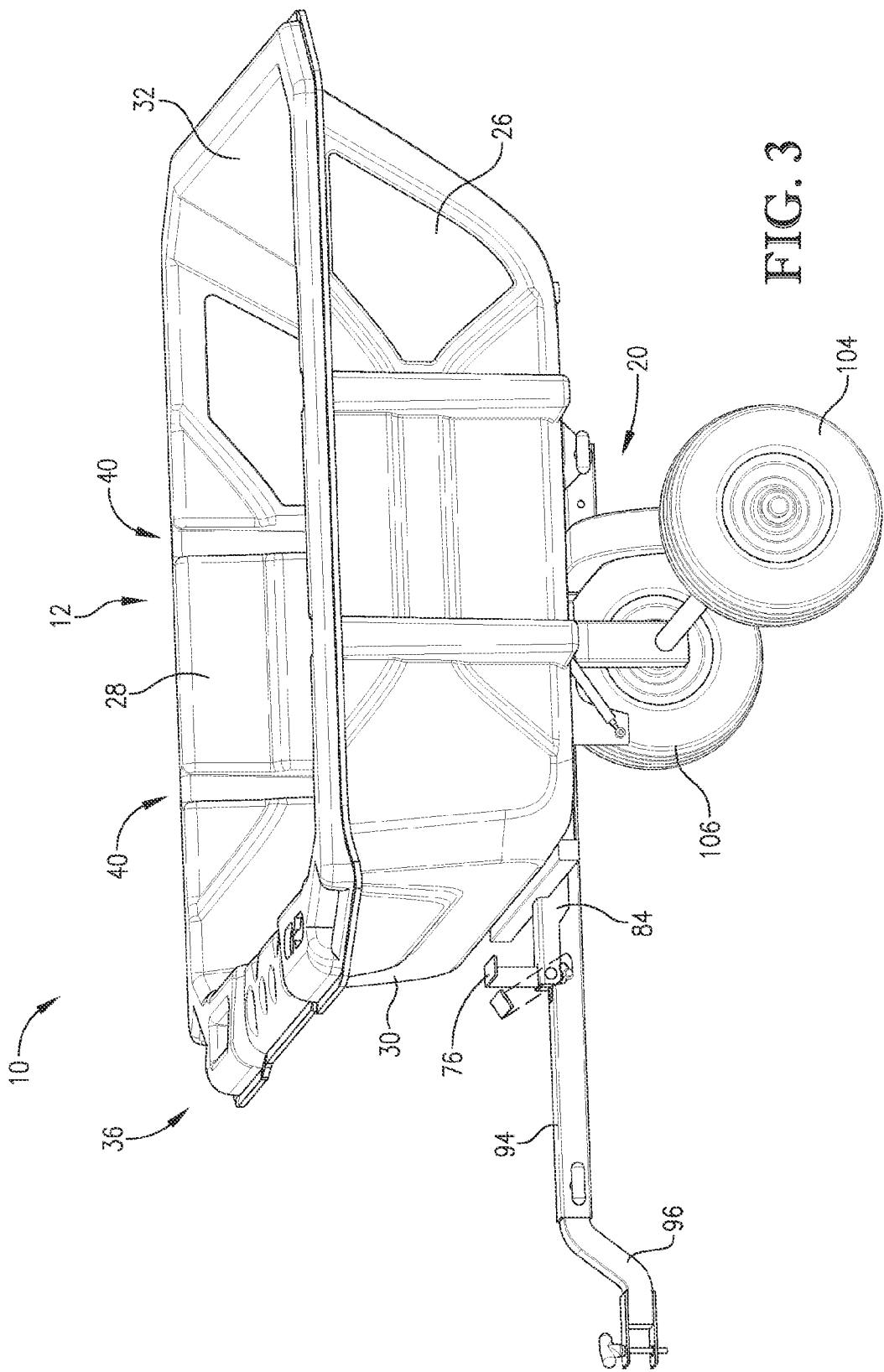
FIG. 3 is a forward perspective view of the dump cart.

The bed handle bracket 74, as seen at least in FIG. 18, may connect to a forward surface of the forward adapter crossmember 62 near the center thereof and may include a pair of spaced-apart, downward-extending flanges 84. The bed handle 76, as seen in FIG. 18, may pivotally connect to the forward end of the bed handle bracket 74 and may include at least one grip portion adapted for a user's hand. The bed handle 76 may be used to lift both the bed adapter 18 and the bed 12 in order to dump the load from the bed 12. The bed handle 76 may further include a bed handle latch 86 that couples with the frame 20 and latches the bed adapter 18 to the frame 20. The bed handle 76 may be pivoted with respect to the bed handle bracket 74, as seen in FIG. 3, in order to unlatch the bed adapter 18 from the frame 20. Typically, the bed handle 76 is pivoted to unlatch the bed adapter 18 from the frame 20 before a load is dumped.

The frame 20, as seen at least in FIGS. 25-28, generally includes various combinations of rails and crossmembers connected together to support the bed 12 and provide structural strength for the dump cart 10. An exemplary frame 20, as shown in the figures, includes a left frame rail 88, a right frame rail 90, a frame crossmember 92, a first center beam 94, a hitch adapter 96, a lift handle 98, and an axle 100. The components of the frame 20 may have a cross-sectional shape of a "C", an "I", an "L", a "T", a hat, or the like, or combinations thereof. The components of the exemplary frame 20 have a box cross-sectional shape.

The left frame rail 88 and the right frame rail 90 may be oriented along the longitudinal axis of the dump cart 10 and spaced apart from one another. The frame rails 88, 90 may be attached to the frame crossmember 92 at a forward end of each frame rail 88, 90. At a rear end of each frame rail 88, 90, there are holes or other mating features to which the attachments tabs 50 on the bed adapter 18 may be removably attached. Fasteners, such as screws, may connect the adapter hinges 72 to the frame rails 88, 90, although exemplary embodiments of the dump cart 10 utilize releasable pins to connect the adapter hinges 72 to the frame rails 88, 90. This connection scheme between the bed adapter 18 and the frame rails 88, 90 allows the bed adapter 18 and the bed 12 to pivot or rotate rearward with respect to the frame 20.

Figure 25:
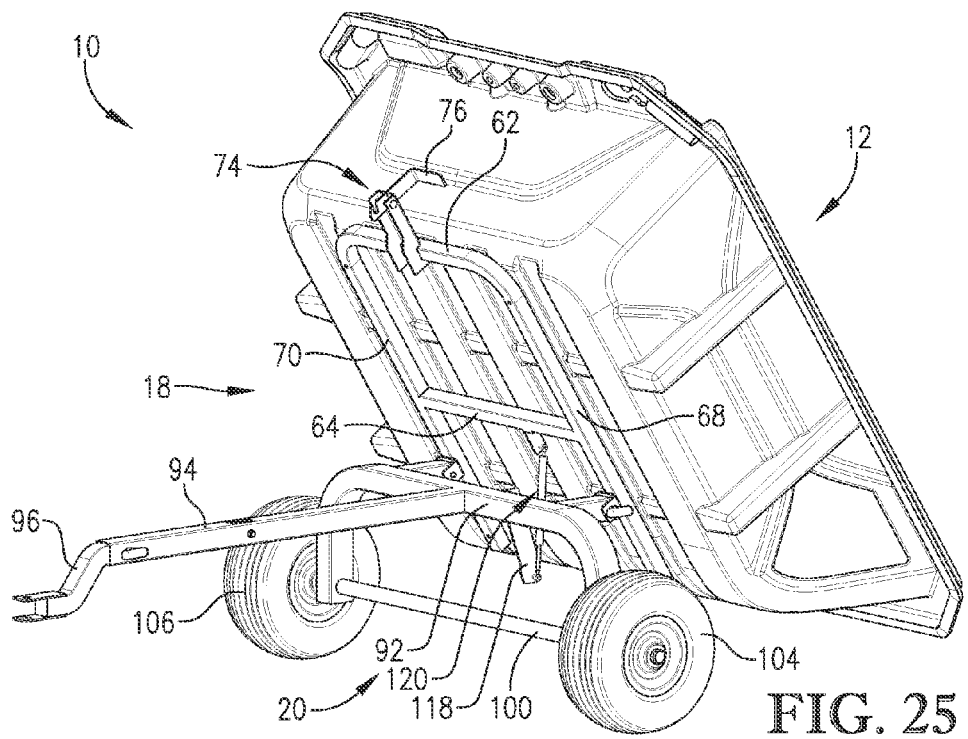
FIG. 25 is a forward perspective view of the dump cart dumping a load to the rear of the cart.
Figure 26:
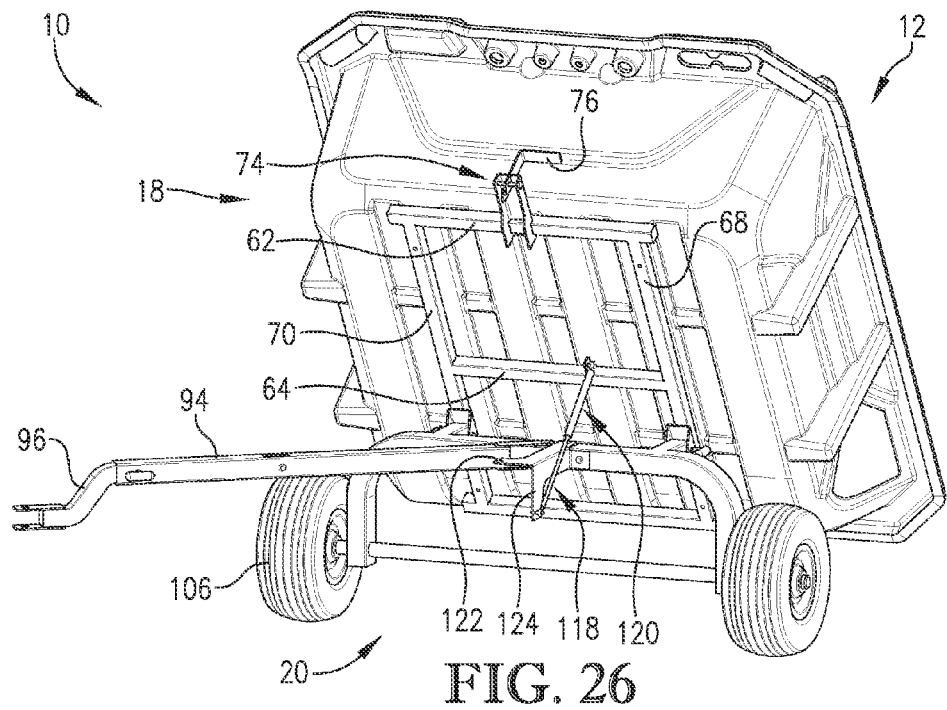
FIG. 26 is a forward perspective view of the dump cart with an alternative embodiment of the frame dumping a load to the rear of the cart.
Figure 27:
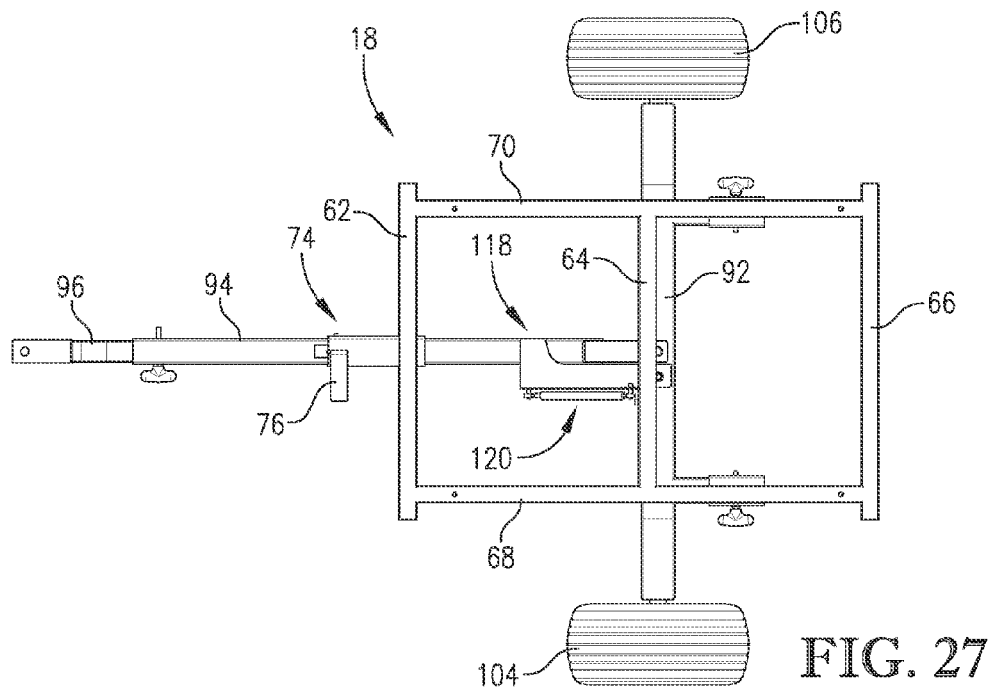
FIG. 27 is a top view of the bed adapter and the alternative embodiment of the frame.
Figure 28:
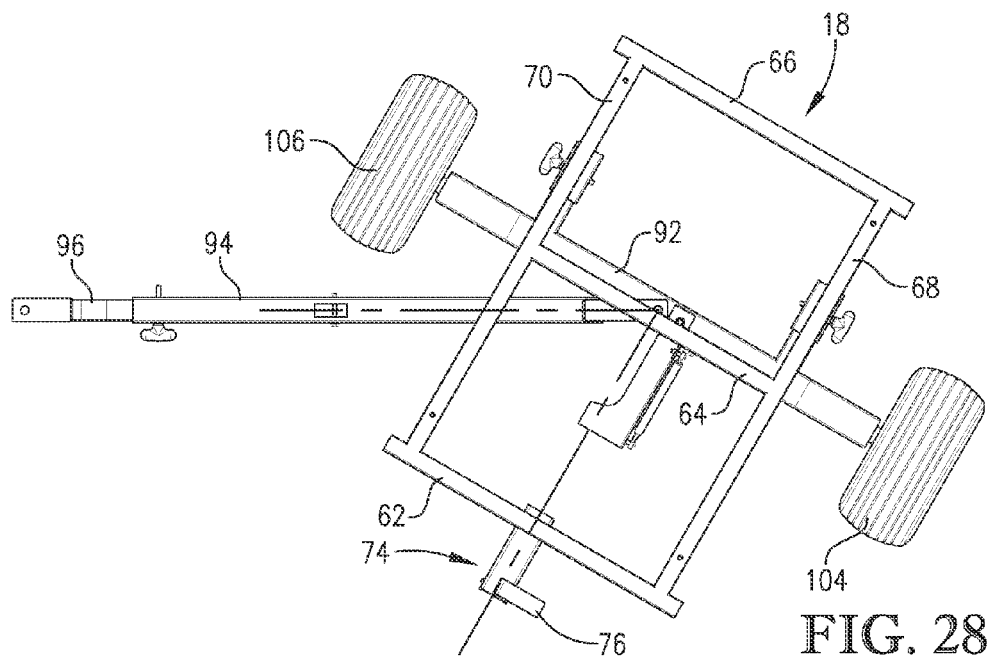
FIG. 28 is a top view of the bed adapter and the alternative embodiment of the frame with a first center beam rotated with respect to the frame and the bed adapter.

The frame crossmember 92 has an inverted "U" shape with a left leg 101 and a right leg 102 extending downward to which the axle 100, a left wheel 104, and a right wheel 106 are connected, respectively. The first center beam 94 may be attached, at its rear end, to the frame crossmember 92 and extend forward therefrom. In some embodiments, the first center beam 94 is rigidly attached to the frame crossmember 92, as shown in FIG. 25. In other embodiments, the first center beam 94 is pivotally attached to the frame crossmember 92, as shown in FIGS. 26-28, to allow the frame rails 88, 90, the frame crossmember 92, the bed adapter 18, and the bed 12 to rotate up to approximately 60 degrees to the left or right side with respect to the first center beam 94 and the pulling vehicle. In alternative embodiments, the frame 20 may include a second center beam (not shown in the figures), generally shorter in length than the first center beam 94, that is rigidly attached to the frame crossmember 92. The first center beam 94 may then be pivotally coupled to the second center beam to provide rotation of the bed 12, the bed adapter 18, the frame crossmember 92, and the wheels 22 with respect to the first center beam 94.

Figure 29:
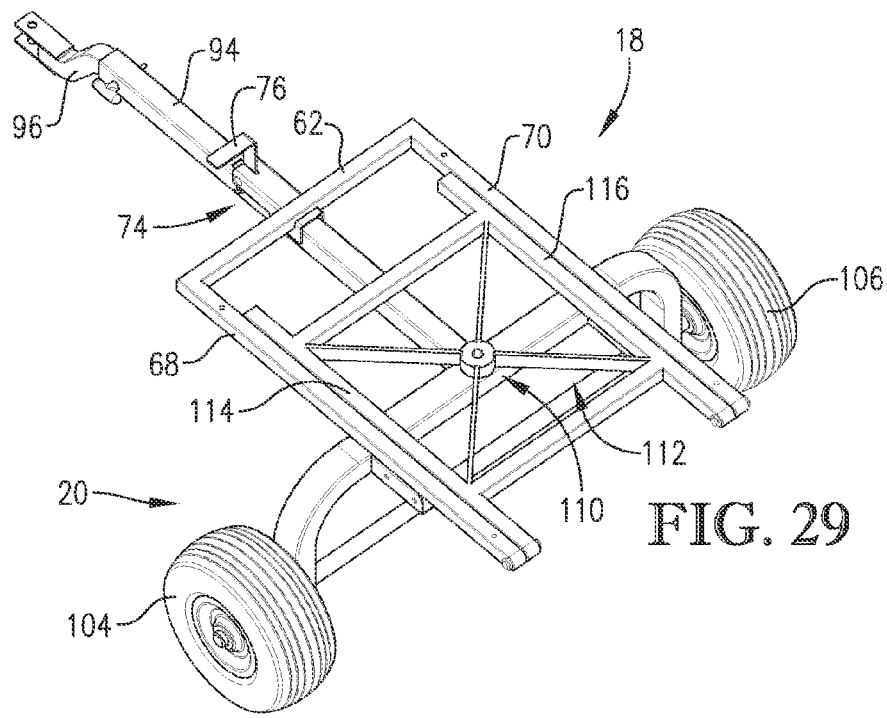
FIG. 29 is a top perspective view of the frame and a second alternative embodiment of the bed adapter.
Figure 30:
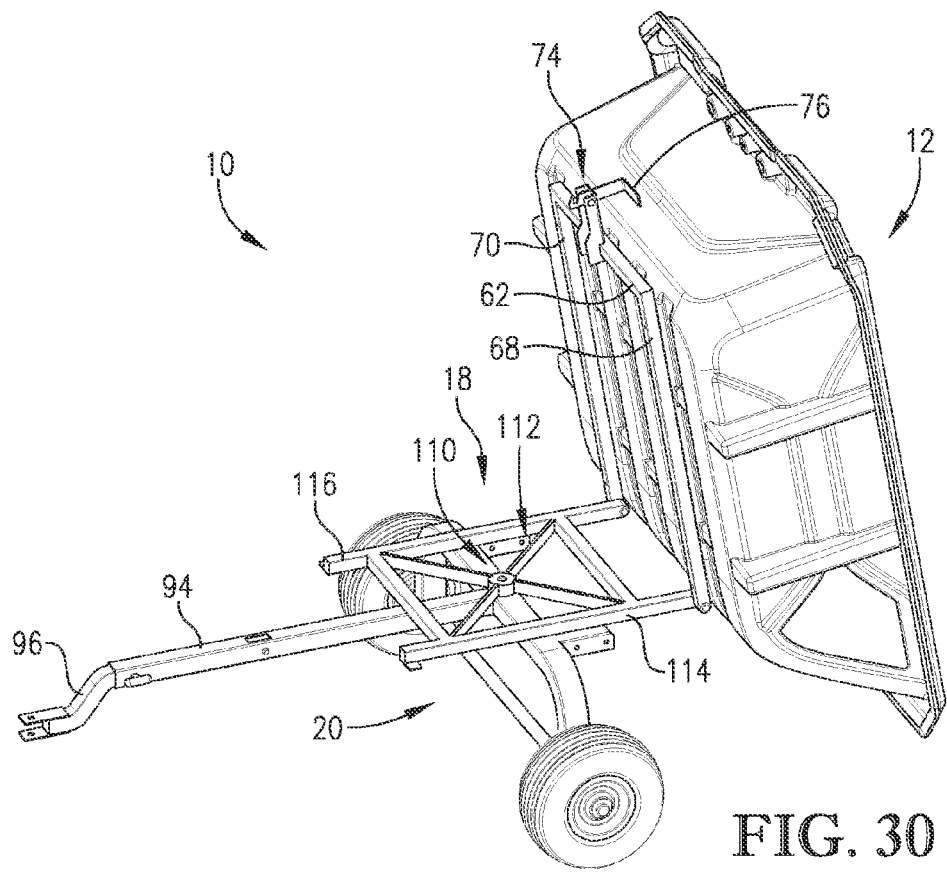
FIG. 30 is a top perspective view of the frame and the second alternative embodiment of the bed adapter with the bed dumping a load to the rear.
Figure 31:
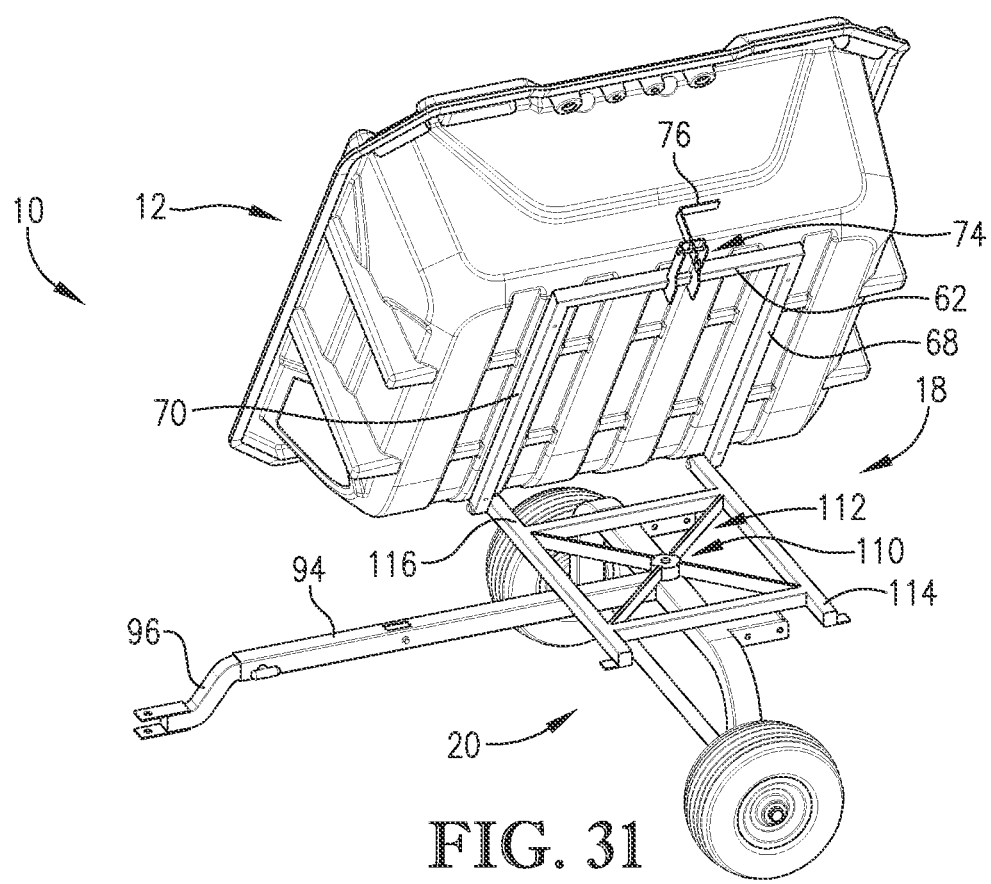
FIG. 31 is a top perspective view of the frame and the second alternative embodiment of the bed adapter with the bed adapter rotated to dump a load to the side of the cart.

In various embodiments, the frame 20 may further include a shaft 110 and a support assembly 112 that allow the bed adapter 18 and the bed 12 to rotate 360 degrees, as shown in FIGS. 29-31. In addition, the bed adapter 18 may further include a left inner adapter rail 114, positioned on the interior side of the left adapter rail 68, and a right inner adapter rail 116, positioned on the interior side of the right adapter rail 70. The left inner adapter rail 114 is pivotally connected to the left adapter rail 68, and the right inner adapter rail 116 is pivotally connected to the right adapter rail 70. In such embodiments, the first center adapter crossmember 64 and the rear adapter crossmember 66 may each connect to the left inner adapter rail 114 and the right inner adapter rail 116, while not being connected to the left adapter rail 68 and the right adapter rail 70. The shaft 110 may be upright or vertically oriented and connected to an upper surface of the frame crossmember 92. The support assembly 112 may include a plurality of rods, bars, plates, braces, or brackets, each with a first end that connects to the base of the rotating shaft 110 and a second, opposing end that connects to combinations of the first center adapter crossmember 64, the rear adapter crossmember 66, the left inner adapter rail 114, and the right inner adapter rail 116. At least a portion of the shaft 110 may be able to rotate. For example, an outer portion of the shaft 110, to which the support assembly 112 is connected, may be able to rotate, while an inner portion, to which the frame crossmember 92 is connected, remains stationary. The rotation of the shaft 110 allows the bed adapter 18 and the bed 12 to rotate 360 degrees with respect to the frame 20 so that the load in the bed 12 may be dumped at any angle, as shown at a first angle in FIG. 30 and at a second angle in FIG. 31.

In various embodiments, the frame 20 may further include a strut bracket 118 and a strut 120, as seen at least in FIGS. 25-26. In some embodiments, the strut bracket 118 may rigidly connect to the frame crossmember 92 adjacent to the first center beam 94 and may include a horizontal flange 122 and a vertical flange 124, as seen in FIG. 26. The horizontal flange 122 may have a horizontally oriented first arm that extends over, and may contact, a portion of the first center beam 94. The vertical flange 124 includes a vertically oriented second arm. In other embodiments, the strut bracket 118 may be coupled to the rear of the frame crossmember 92 and may include just the vertical flange 124, as seen in FIG. 25. The strut 120 generally resists longitudinal compression may include springs or a gas spring, as an example. One end of the strut 120 may be pivotally connected to the second arm of the strut bracket 118. The other end of the strut 120 may be pivotally connected to the first center adapter crossmember 64 of the bed adapter 18. The strut 120 may assist the user in raising the bed 12 by exerting a force on the bed adapter 18 and the bed 12 in order to dump the load therefrom.

The first center beam 94 may include an opening at its forward end to receive either the hitch adapter 96 or the lift handle 98. The first center beam 94 may also include holes or other mating features that allow either the hitch adapter 96 or the lift handle 98 to be removably connected to the first center beam 94. Fasteners, such as screws, may be used in the holes although exemplary embodiments of the dump cart 10 utilize releasable pins.

The hitch adapter 96, as seen in FIGS. 1-4, 8-9, and 13-31, may include a hitch post or hitch holes, whichever is appropriate, to couple the dump cart 10 to the pulling vehicle. The lift handle 98, as seen in FIGS. 32-41, may include one or more gripping surfaces adapted for a user's hands. In some embodiments, the lift handle 98 may extend along the same axis as the first center beam 94. In other embodiments, the lift handle 98 may extend at an angle with respect to the axis of the lift handle 98. The hitch adapter 96 is connected to the first center beam 94 when the dump cart 10 is used for carrying a load. The lift handle 98 is connected to the first center beam 94 when the dump cart 10 is used for lifting objects.

The hit adapter 24, seen in FIGS. 32-41, generally allows the dump cart 10 to couple to an object in order to lift it and may include various combinations of rails and crossmembers connected together to interface with the frame 20. An exemplary lift adapter 24 includes a left lift rail 130, a right lift rail 132, a lift crossmember 134, a left cradle arm 136, a right cradle arm 138, a lift hitch coupler 140, and a stabilizer leg 142. The left lift rail 130 and the right lift rail 132 may be spaced apart and rigidly connected to the lift crossmember 134. The lift rails 130, 132 may be oriented and positioned in order to align with the left frame rail 88 and the right frame rail 90, respectively. The left cradle arm 136 and the right cradle arm 138 may also be spaced apart and rigidly connected to the lift crossmember 134. The cradle arms 136, 138 may have a vertical or upright orientation and may each include a cradle 144 with opposing fingers configured to retain a portion of the object to be lifted. For example, if the dump cart 10 is used to lift a tractor or mower, the cradle 144 retains a bracket or bar that is mounted to the front end of the tractor or mower.

Figure 35:
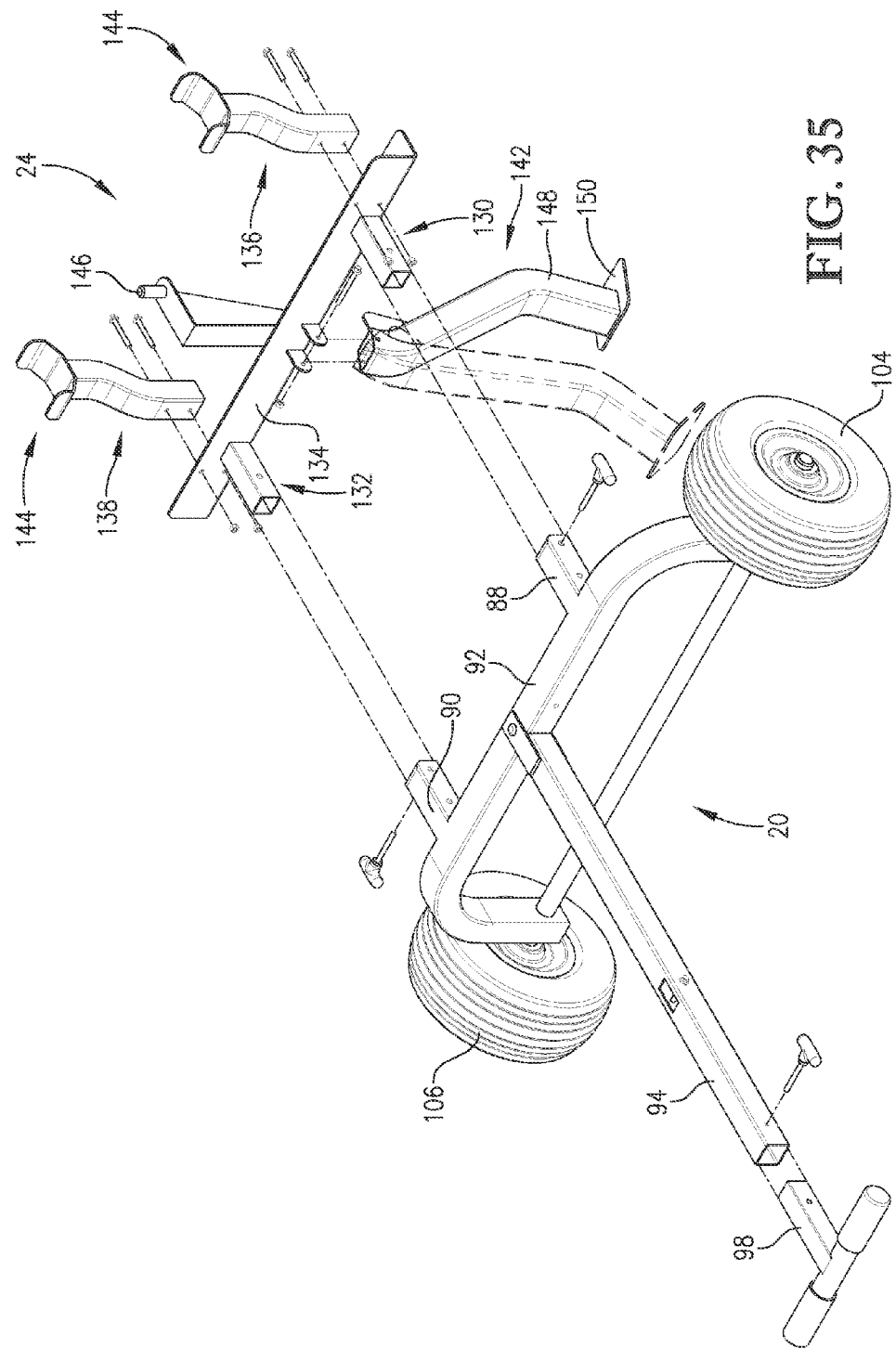
FIG. 35 is a top, forward, partially-exploded perspective view of the frame and an alternative embodiment of the lift adapter.

The lift hitch coupler 140 may connect to the lift crossmember 134, in some embodiments as seen in FIGS. 32-34 and 38-41, or to the cradle arms 136, 138, in other embodiments as seen in FIGS. 35-37, and may include a lift post 146 that couples with a portion of the object to be lifted. For example, if the dump cart 10 is used to lift a tractor or mower, the lift hitch coupler 140 may couple to a hitch connector that is mounted to the rear end of the tractor or mower.

Figure 32:
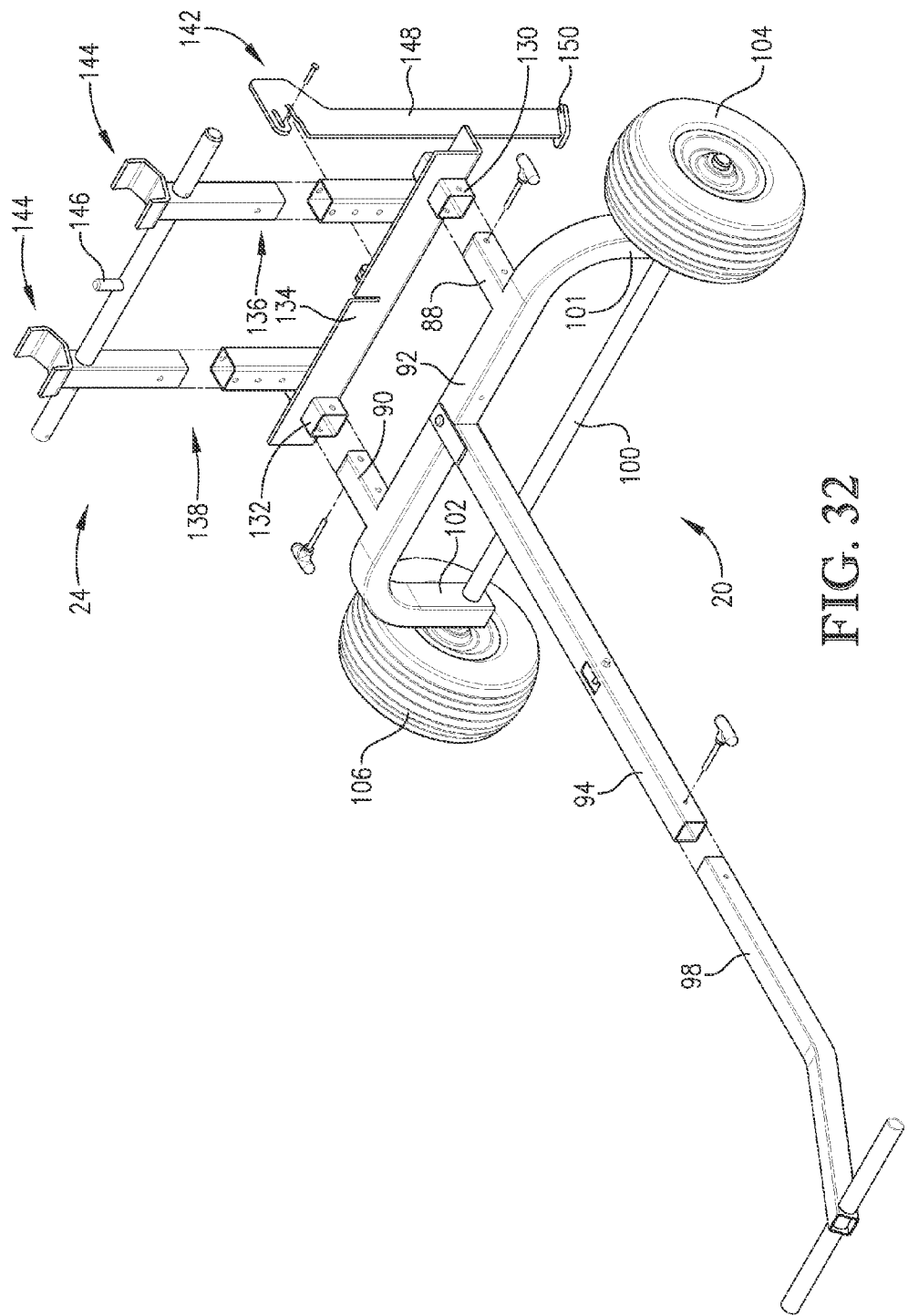
FIG. 32 is a top, forward, partially-exploded perspective view of the frame and a lift adapter.

The stabilizer leg 142 generally provides support and stability for the dump cart 10 when the lift adapter 24 is used to lift an object and may support a portion of the weight of the object. The stabilizer leg 142 is generally manufactured from a strengthened material such as steel and may include an elongated shaft 148 and a foot 150. In some embodiments, the shaft 148 is generally straight and coupled to the rear side of the lift crossmember 134, as seen in FIGS. 32-34. In other embodiments, the shaft 148 may couple to the forward side of the lift crossmember 134 and include three sections with a bend between adjacent sections, such that there is a first bend between the first section and the second section in one direction and a second bend between the second section and the third section in the opposite direction, as seen in FIGS. 35-41. Thus, the third section is parallel to but offset from the first section. The foot 150 for both embodiments may be rectangular shaped and generally planar although in various embodiments, the edges of the foot 150 may be curved. The foot 150 may be rigidly attached to one end of the shaft 148.

The dump cart 10 may operate as follows. The dump cart 10 may be used to carry a load such as wood, rocks, bricks, dirt, grass from a mower, or the like. In these situations, the dump cart 10 may be coupled to a pulling vehicle, such as a tractor or a mower (shown in FIGS. 1-2), by having the hitch adapter 96 connected to the first center beam 94 and then connecting the hitch adapter 96 to a hitch on the pulling vehicle. When it is time to dump the load from the bed 12, the bed handle 76 may be pivoted, as seen in FIG. 3, to release the bed handle latch 86 from the first center beam 94. The bed handle 76 may then be lifted, as shown in FIGS. 2, 18, and 25-26, to dump the load from the bed 12. The strut 120 may provide an assistance in lifting by exerting a force on the bed adapter 18 and in turn, the bed 12. The load may be dumped from the rear of the bed 12.

In embodiments of the dump cart 10 wherein the first center beam 94 is pivotally connected to the frame crossmember 92, allowing the bed to rotate with respect to the first center beam 94 and the pulling vehicle, the load may be dumped to the side of the pulling vehicle. In such situations, the bed handle 76 may be pivoted to release the bed handle latch 86 from the first center beam 94. The bed handle 76 may then be lifted slightly such that it clears the first center beam 94 and pulled to the side so that the frame crossmember 92, the wheels 22, and the bed 12 rotate with respect to the first center beam 94 and the pulling vehicle, as shown in FIGS. 26 and 28. When the bed 12 is rotated to the desired position, the bed handle 76 may be lifted in order to dump the load from the bed 12, as seen in FIG. 26. The strut 120 may provide assistance in lifting the bed 12.

Figure 22:
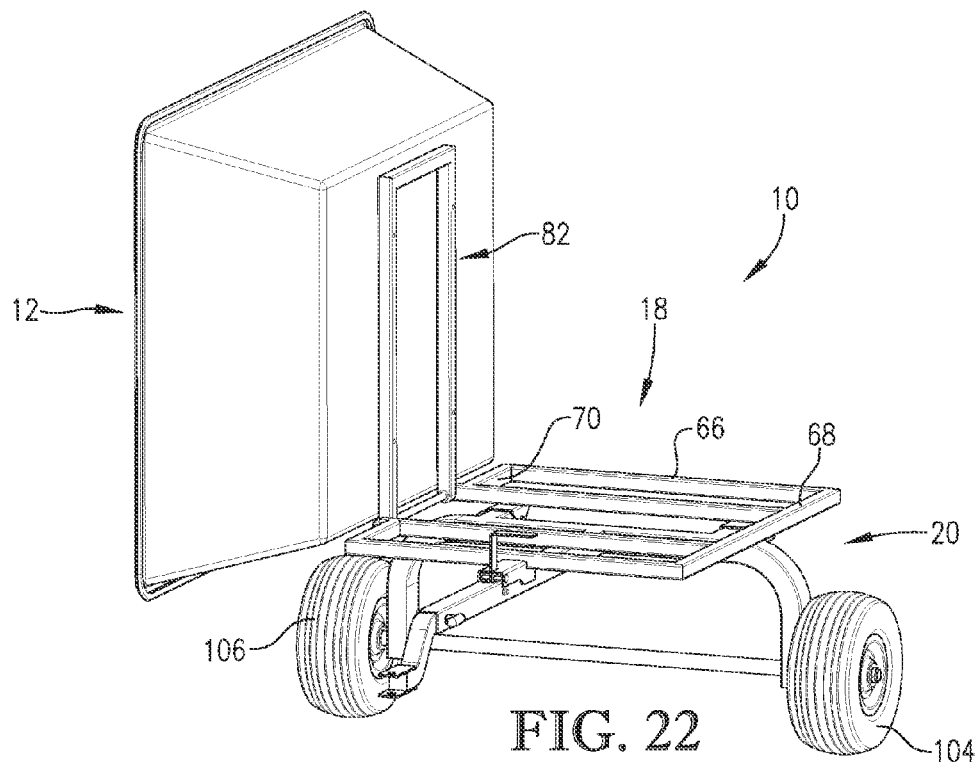
FIG. 22 is a forward perspective view of an alternative embodiment of the dump cart dumping a load to the side of the cart.
Figure 23:
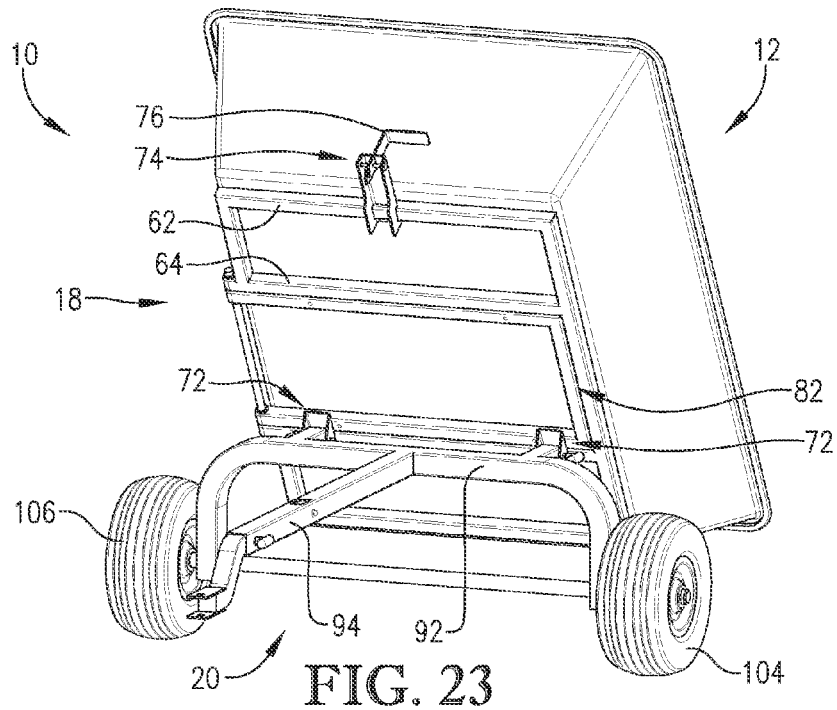
FIG. 23 is a forward perspective view of the alternative embodiment of the dump cart dumping a load to the rear of the cart.
Figure 24:
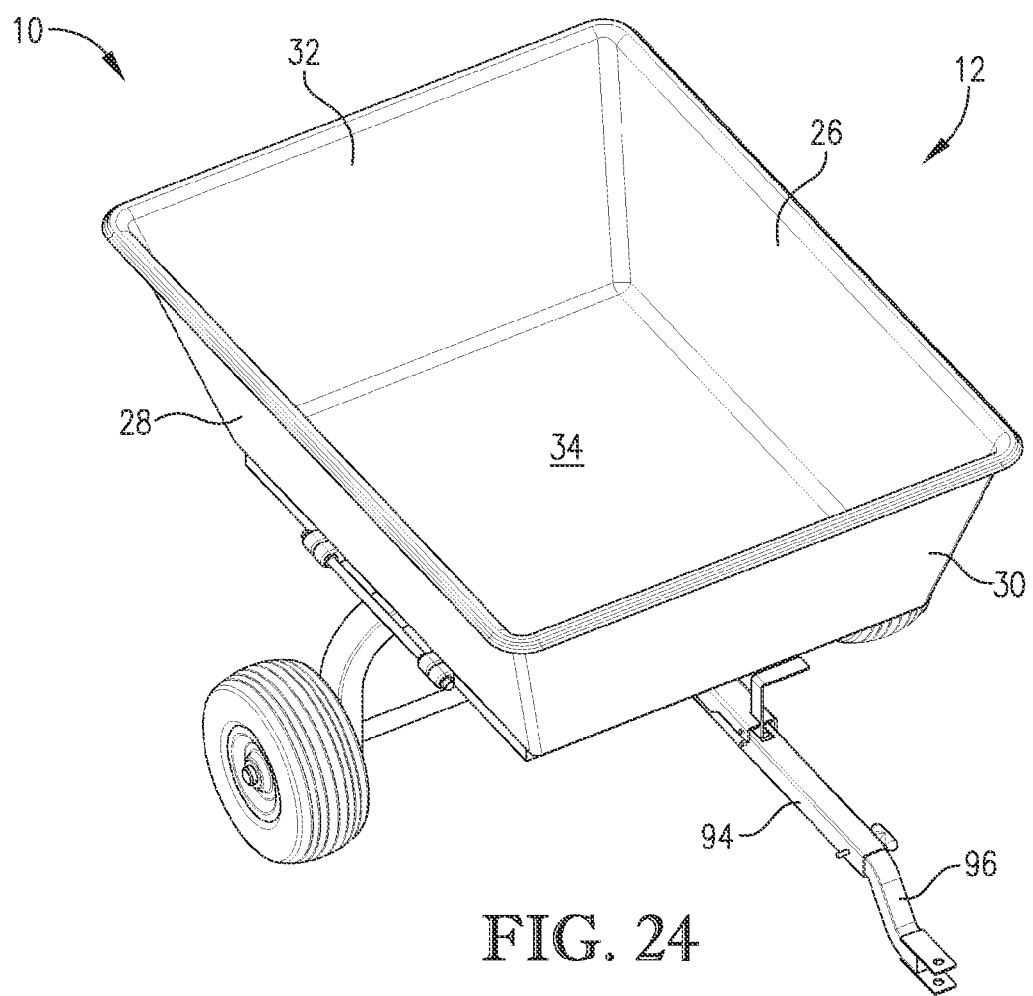
FIG. 24 is a top perspective view of the alternative embodiment of the dump cart.

In embodiments of the dump cart 10 wherein the bed 12 pivots sideways with respect to the bed adapter 18, the bed 12 may be dumped to the rear by lifting the bed handle 76 as described above and seen in FIGS. 18 and 23. The bed 12 may also be dumped to the side by simply lifting the bed 12 on the side opposing the side which is pivotally connected to the bed adapter 18, as seen in FIGS. 19 and 22. In situations where the bed 12 is dumped to the side, the strut 120 does not provide assistance.

In embodiments of the dump cart 10 wherein the frame 20 includes the rotating shaft 110, when it is time to dump the load, the bed handle 76 may be pivoted to release the bed handle latch 86 from the first center beam 94. The bed handle 76 may then be lifted slightly such that it clears the first center beam 94 and rotated to any angle. The shaft 110, the support assembly 112, the bed adapter 18 and the bed 12 are rotated as well. At the desired angle, the bed handle 76 may be fully lifted to dump the load, as shown in FIG. 31. The strut 120 is generally not included with these embodiments.

The bed 12 and the panels 14 may be used to form a work surface. In situations where the bed is used to carry a load, the panels 14 may optionally be used to form separate compartments within the bed 12. For example, the first panel 46 may be placed in the forward groove 40 and the second panel 48 may be placed in the rear groove 40, as shown in FIG. 6. Three separate compartments may be created by placement of the panels 14 in the grooves 40. If a work surface is needed, then the panels 14 may be removed from the grooves 40. The bars 16 may be placed in the slots 42 and the panels 14 may be placed on top of the bars 16, as shown in FIGS. 7 and 9. In certain situations, the panels 14 may be placed such that the bars 16 align with and fit into channels 44 on one surface of the panels 14. In some embodiments, the panels 14 include interlocking tabs 50 so that the edges of the panels 14 can be pushed together and locked to form a continuous upper surface for the bed 12, as shown in FIGS. 10 and 13. In other embodiments, the panels 14 may be abutted with one another or spaced apart as desired to form the work surface, which may utilized for constructing, assembling, or repairing objects, cutting or drilling objects, temporarily storing objects, or the like.

The dump cart 10 may also be used to lift an object. Typically, the dump cart 10 is used to lift the towing vehicle although it could be used to lift other objects. For example, if the towing vehicle is a tractor or similar small vehicle, then the dump cart 10 may be used to lift the tractor to perform maintenance or repair such as changing a tire. If the towing vehicle is a mower, then the dump cart 10 may be used to lift the mower to repair or replace the cutting blade.

To prepare the dump cart 10 to lift an object, the bed 12 and the bed adapter 18 are removed by pivoting the bed handle 76 to release the bed handle latch 86 from the first center beam 94. The bed adapter 18 is removed from the left frame rail 88 and the right frame rail 90 of the frame 20. In some embodiments, releasable pins are used to connect the bed adapter 18 to the frame 20, as seen for example in FIG. 15. The pins are easily released and removed. With the bed adapter 18 and the bed 12 removed, the lift adapter 24 may be attached to the frame 20. Specifically, the left lift rail 130 is coupled to the left frame rail 88, and the right hit rail 132 is coupled to the right frame rail 90, as shown for the two embodiments of the stabilizer leg 142 in FIGS. 32-37. The releasable pins may be used to couple the lift adapter 24 to the frame 20. The stabilizer leg 142 may be placed in a forward position. In addition, the hitch center adapter 96 may be removed from the first center beam 94, and the lift handle 98 may be coupled thereto. In some embodiments, a releasable pin may be used to connect the hitch adapter 96 or the lift handle 98 to the first center beam 94.

Figure 38:
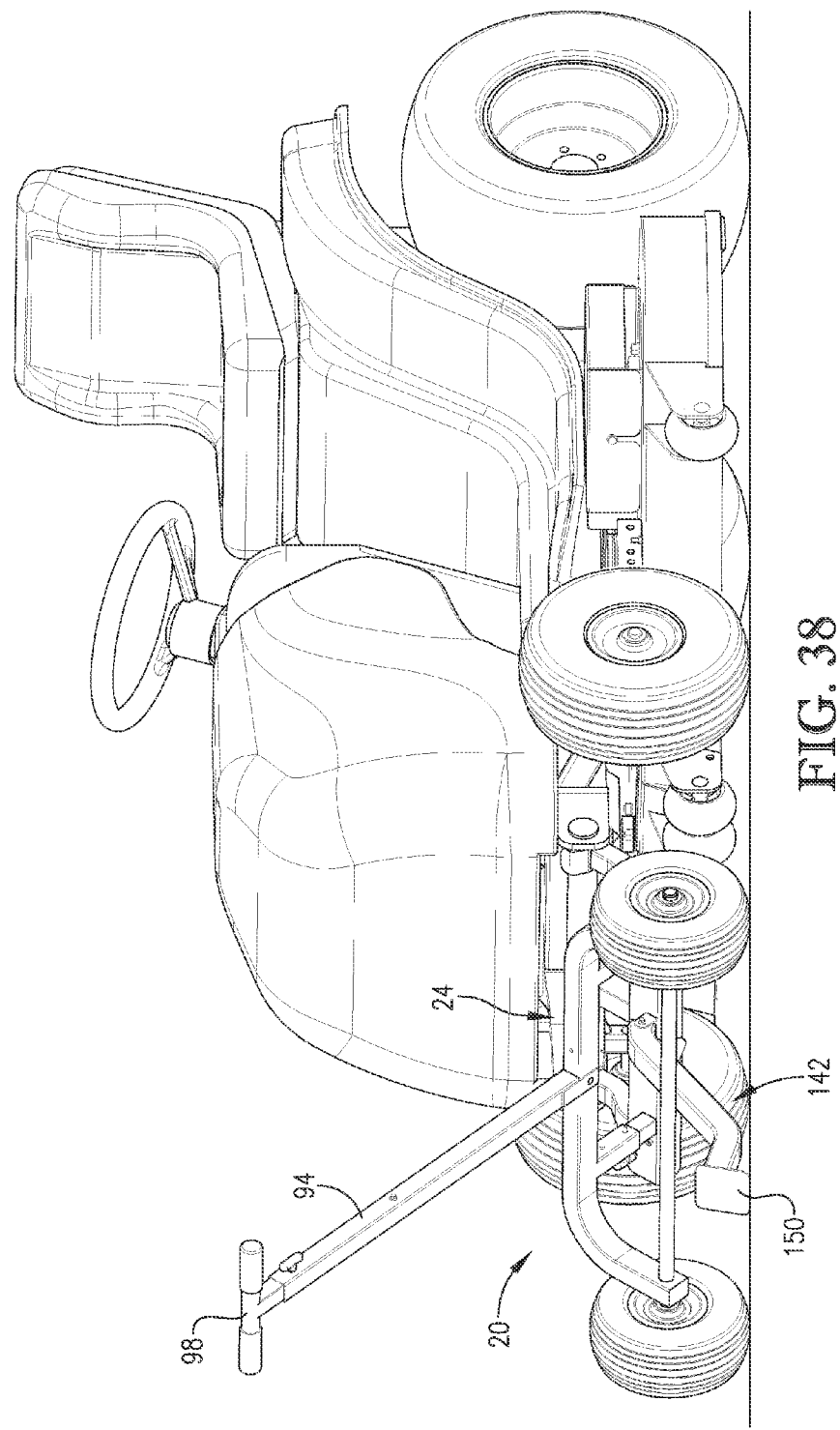
FIG. 38 is a forward perspective view of the frame and the alternative embodiment of the lift adapter preparing to lift the front end of a tractor.
Figure 39:
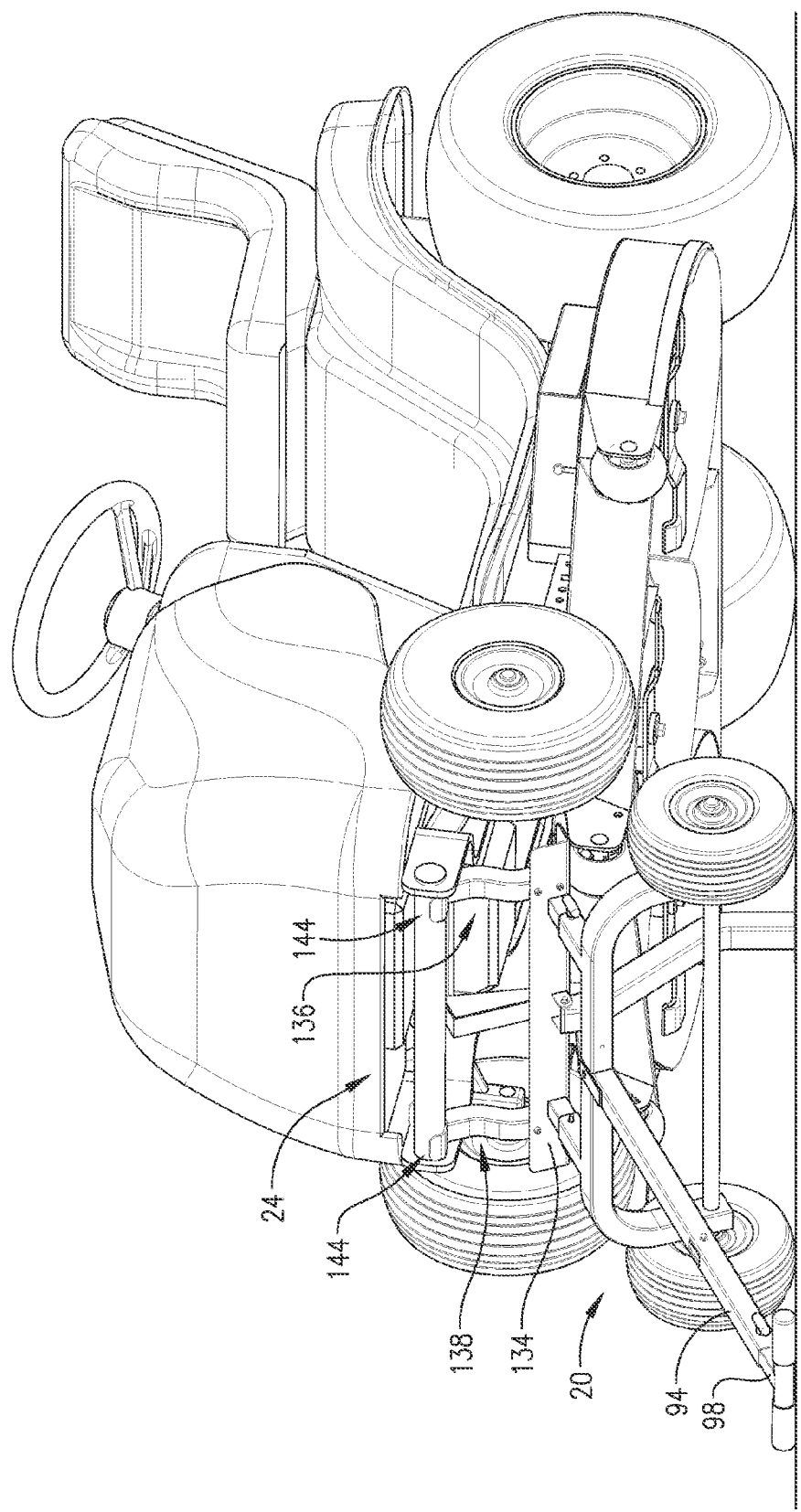
FIG. 39 is a forward perspective view of the frame and the alternative embodiment of the lift adapter lifting the front end of the tractor.
Figure 40:
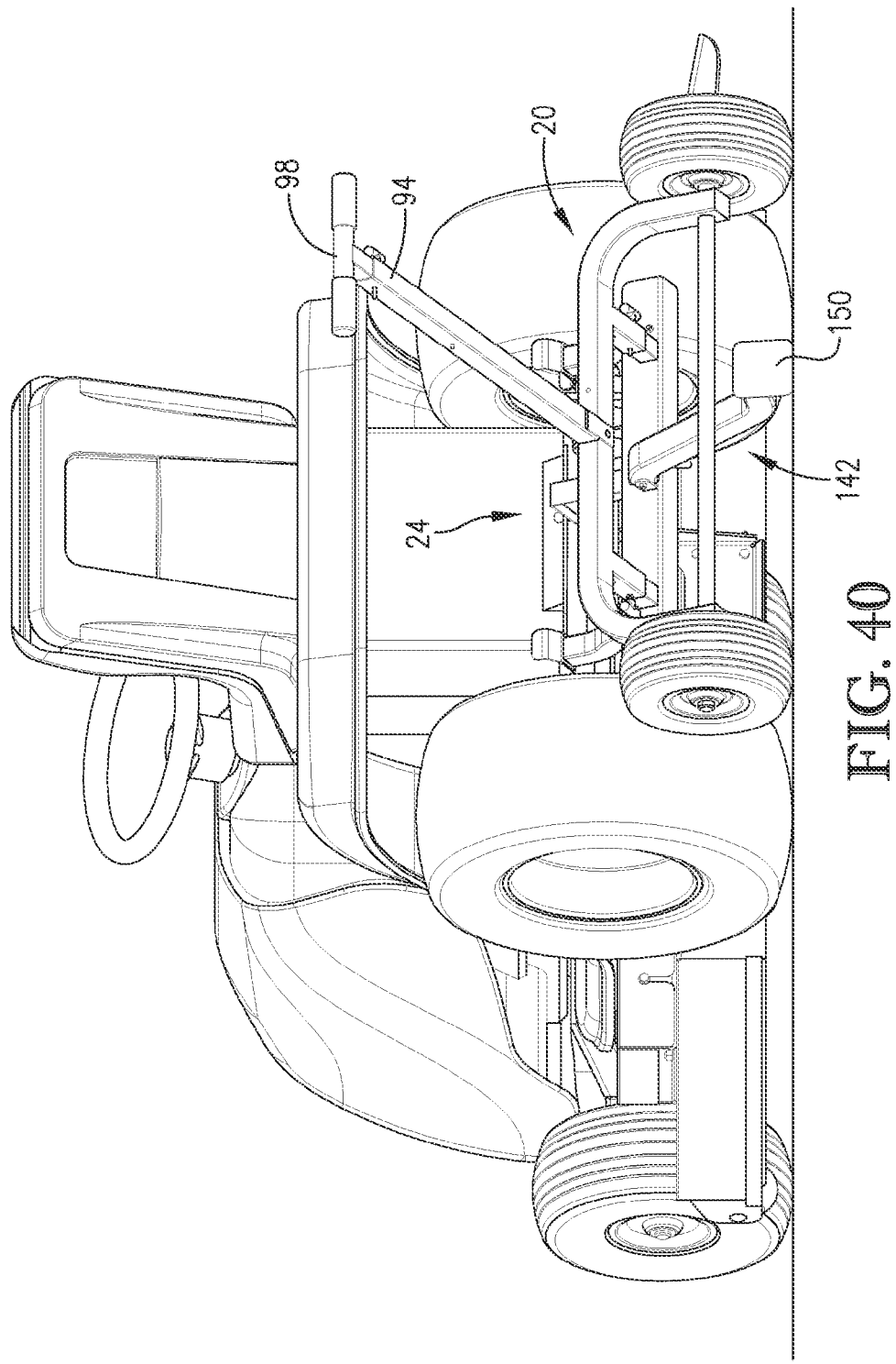
FIG. 40 is a rear perspective view of the frame and the alternative embodiment of the lift adapter preparing to lift the rear end of the tractor.
Figure 41:
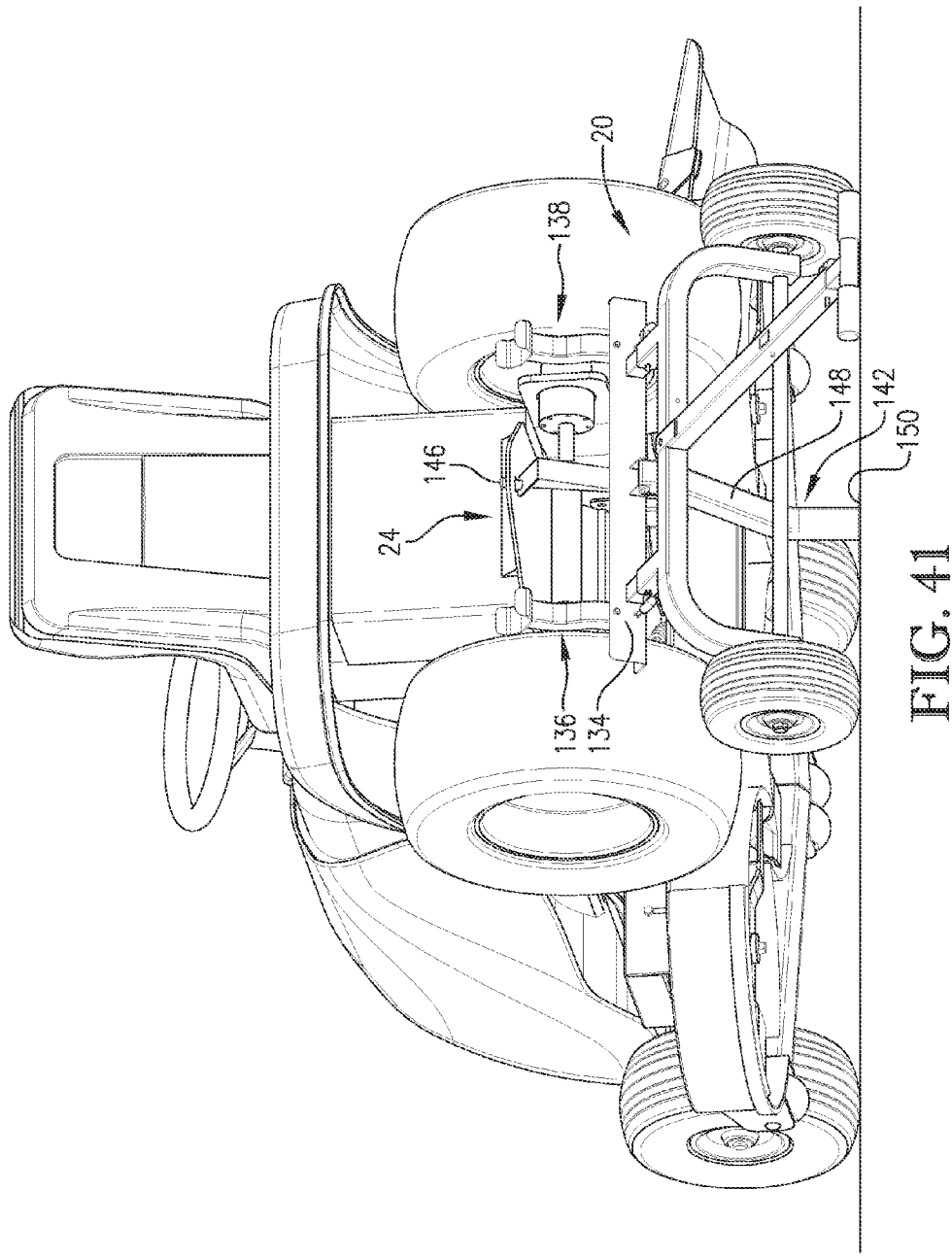
FIG. 41 is a rear perspective view of the frame and the alternative embodiment of the lift adapter lifting the rear end of the tractor.

With the dump cart 10 prepared to lift an object, the dump cart 10 is then positioned in proximity to the object. The lift handle 98 is raised, and in turn, the lift adapter 24 is lowered. If the dump cart 10 is used to lift a vehicle, then either the cradle arms 136, 138 are aligned with a feature, such as a bar, on the front end of the vehicle as seen in FIG. 38, or the lift hitch coupler 140 is aligned with the hitch at the rear of the vehicle as seen in FIG. 40. The lift handle 98 is lowered, the lift adapter 24 is raised, and the object is contacted and lifted, as shown in FIGS. 39 and 41. In the process, the stabilizer leg 142 swings rearward. When the lift adapter 24 is raised to a certain height, the stabilizer leg 142 swings far enough so that the foot 150 is positioned flat on the ground. At this point, the lift handle 98 may be released, and the dump cart 10 will retain the object in a lifted position.

To lower the object, the lift handle 98 may be lowered, and the lift adapter 24 raised, until the stabilizer leg 142 can swing freely. The stabilizer leg 142 may be manually rotated forward until the foot 150 either contacts the ground at an angle or is positioned at an angle with respect to the ground. The lift handle 98 may then be raised as the object is lowered. When the object is resting on the ground, the lift adapter 24 may be uncoupled from the object.

Figure 42:
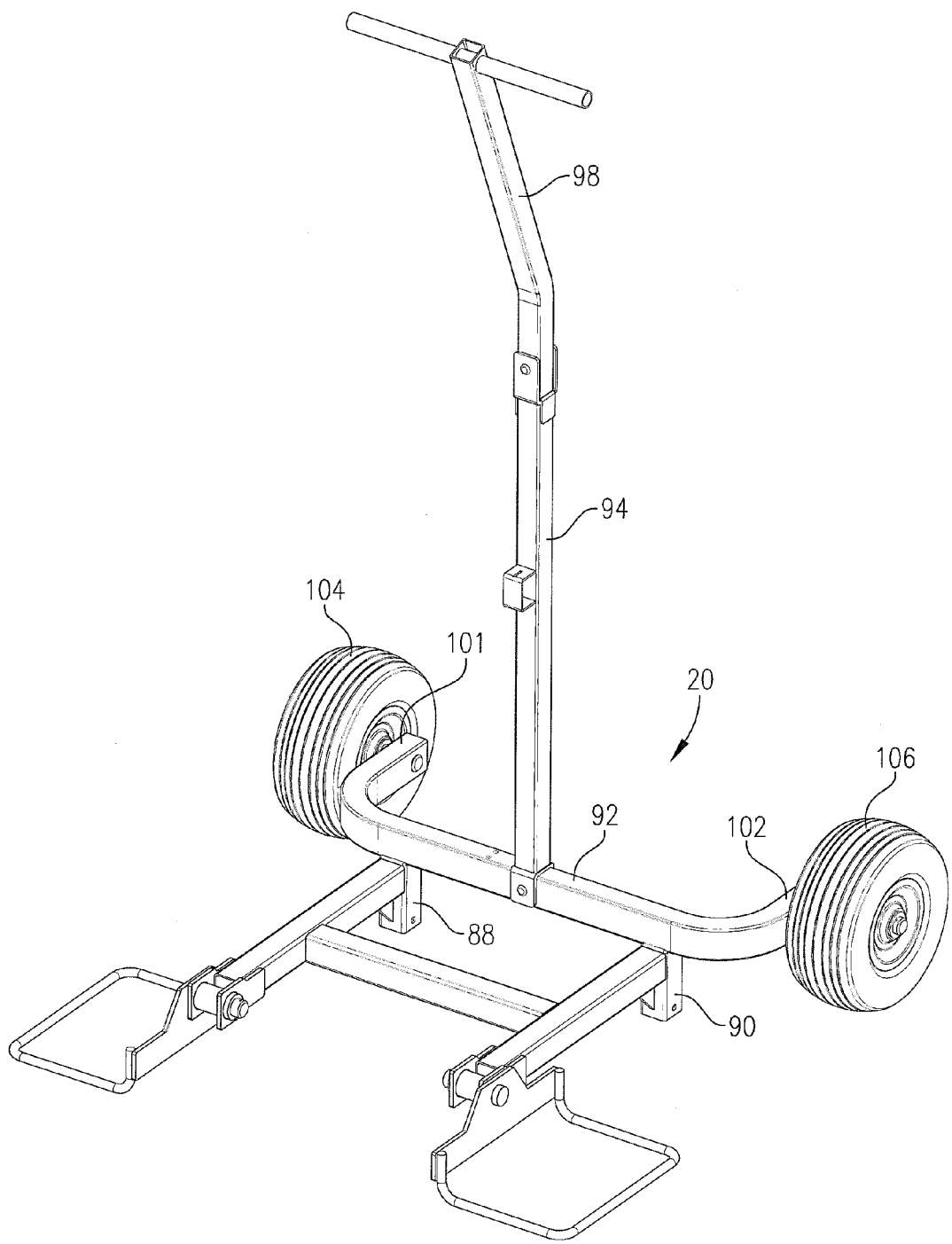
FIG. 42 is a forward perspective view of the frame and another embodiment of the lift adapter in a lower loading position.

In FIG. 42, an additional embodiment of the dump cart is shown wherein the dump cart is used to lift an object such as a vehicle. Instead of the lift adapter 24, an additional embodiment of the lift adapter may be used which includes a left lift arm which may couple to the left frame rail 88 and a right lift arm which may couple to the right frame rail 90 and a lift beam positioned therebetween. Coupled to the free end of the left lift arm is a left tire frame. Coupled to the free end of the right lift arm is a right tire frame. Each tire frame is free to rotate about the end of the respective arm to which it is coupled. Furthermore, each tire frame includes a four-member rectangular open frame configured to receive a wheel or tire of the vehicle to be lifted.

Figure 43:
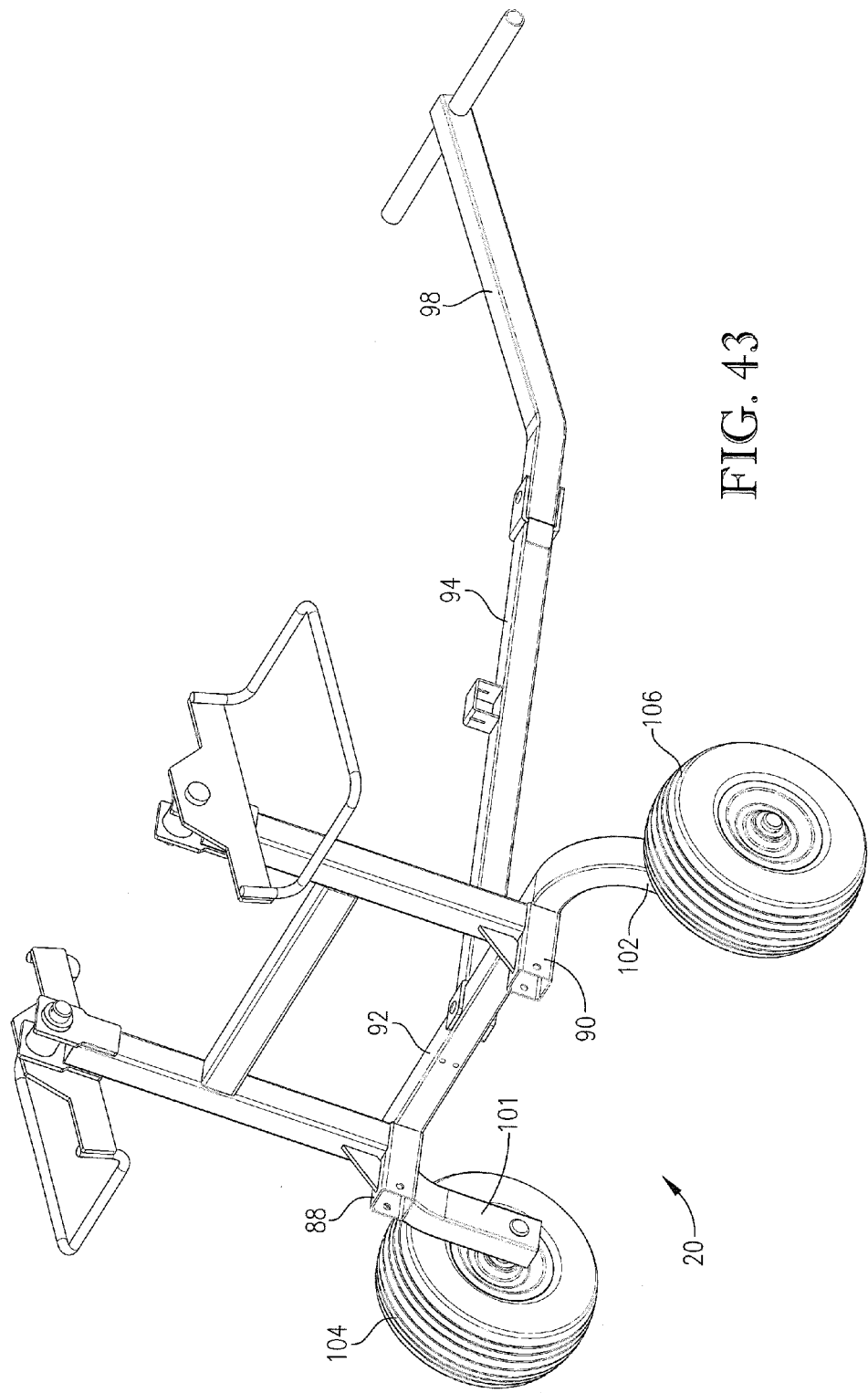
FIG. 43 is a forward perspective view of the frame and another embodiment of the lift adapter in an upper lifting position.

Typically, the lift handle 98, the frame 20, and the additional embodiment of the lift adapter are positioned as shown in FIG. 42. The vehicle to be lifted is moved toward the lift adapter such that a first tire is positioned within the left tire frame and a second tire is positioned within the right tire frame. The lift handle may be lowered or pushed downward, as shown in FIG. 43, to raise the vehicle. The tire frames may rotate with respect to the lift arms as also shown in FIG. 43. After service of the vehicle, the lift handle may be raised (FIG. 42) to lower the vehicle.

Figure 44:
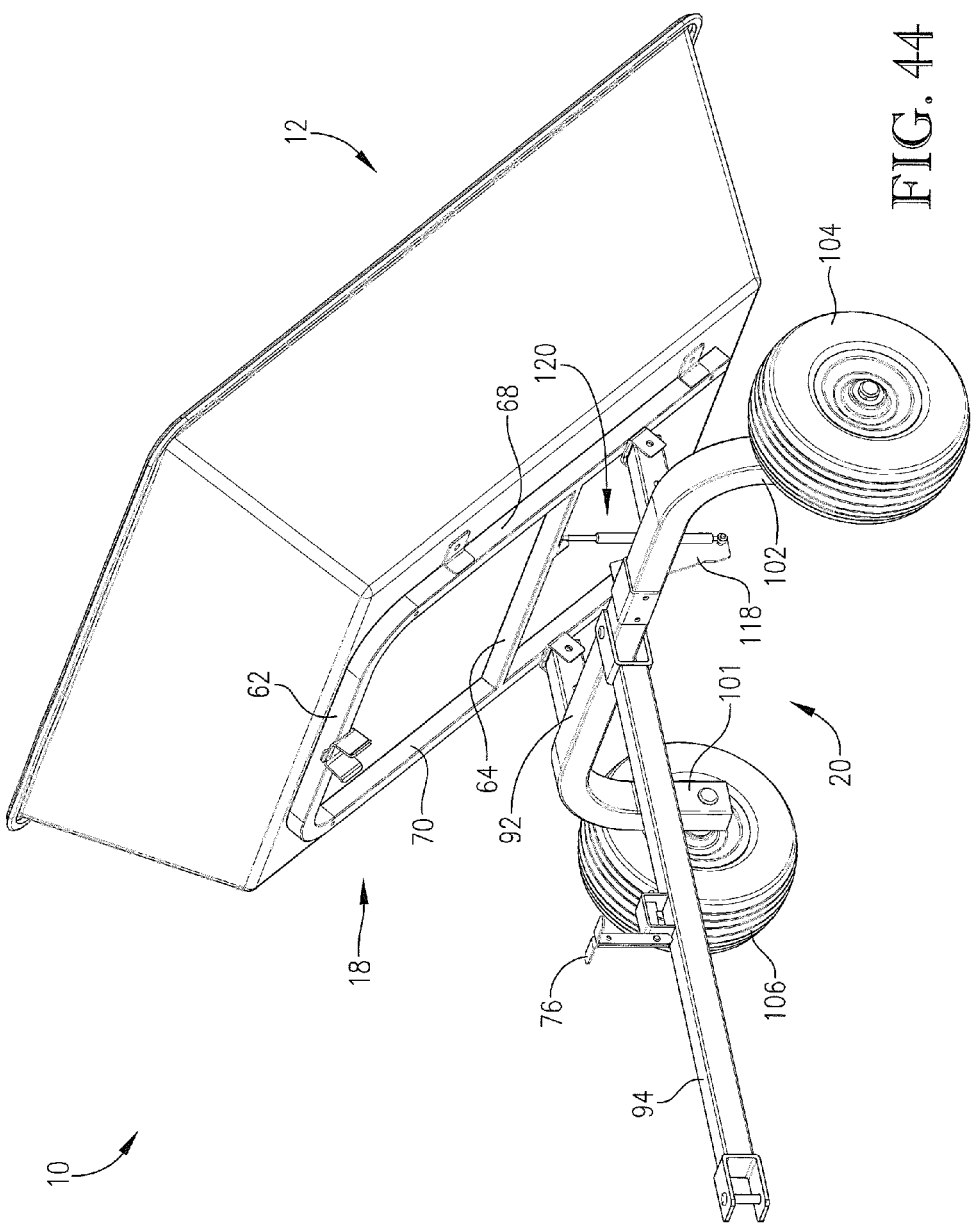
FIG. 44 is a forward perspective view of the dump cart with another embodiment of the frame dumping a load to the rear of the cart.

In FIG. 44, another embodiment of the dump cart is shown with the bed raised in order to dump the load therefrom.

Figure 45:
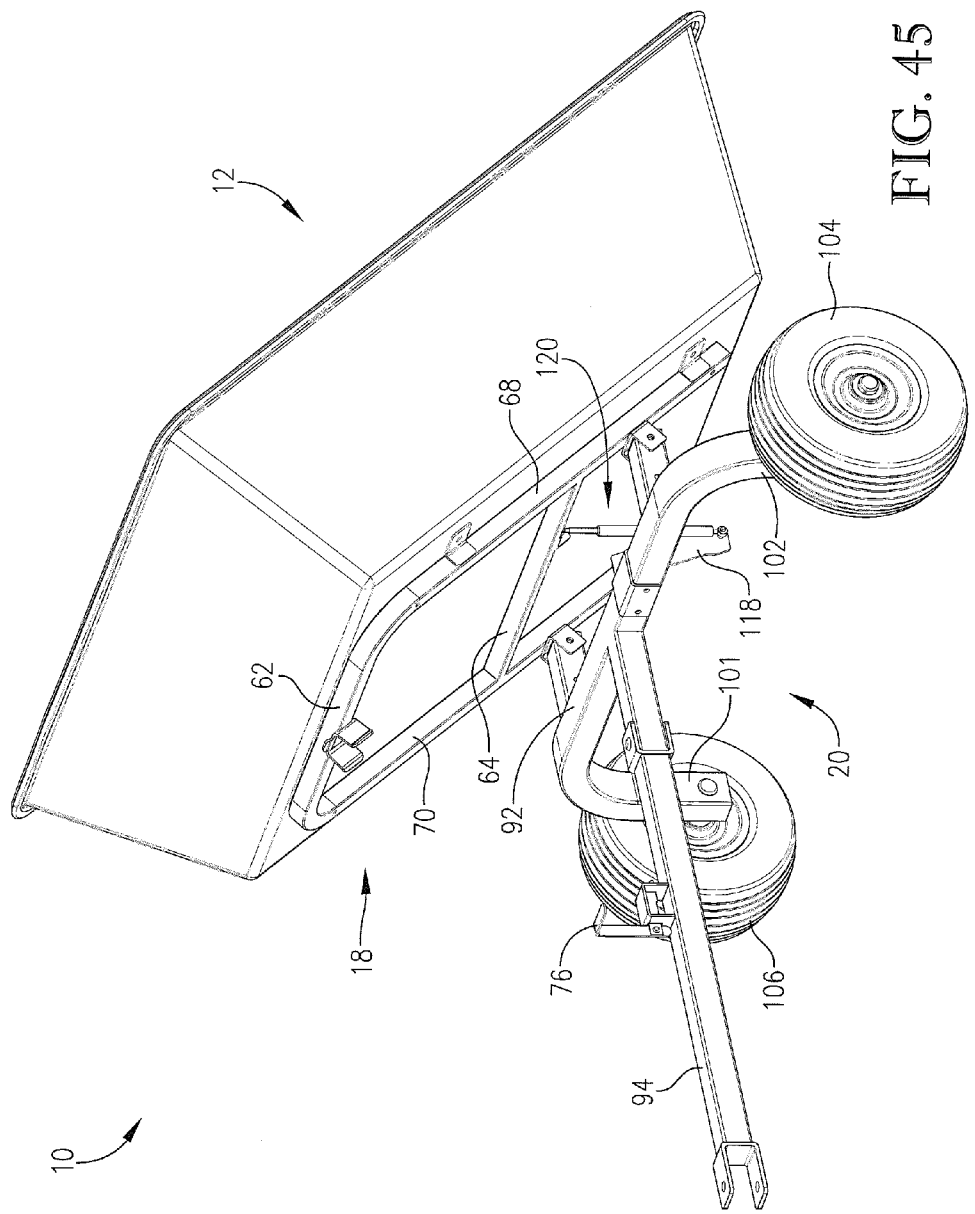
FIG. 45 is a forward perspective view of the dump cart with yet another embodiment of the frame dumping a load to the rear of the cart.

In FIG. 45, yet another embodiment of the dump cart is shown with the bed raised in order to dump the load therefrom.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A dump cart comprising:
   a bed configured to carry a load;
   a bed adapter configured to couple to a bottom wall of the bed, the bed adapter including a left adapter rail and a right adapter rail, both adapter rails configured to contact the bottom wall; and
   a frame pivotally coupled to the bed adapter, the frame including
   a frame crossmember,
   a left frame rail rigidly coupled to the frame crossmember and pivotally coupled to the left adapter rail,
   a right frame rail rigidly coupled to the frame crossmember and pivotally coupled to the right adapter rail, the right frame rail in combination with left frame rail allowing the bed to dump the load to the rear of the dump cart, and
   a center beam configured to removably couple to a pulling vehicle, the center beam coupled to the frame crossmember and extending forward therefrom.

2. The dump cart of claim 1, further comprising a strut with a first end coupled to the frame and a second end coupled to the bed adapter to provide assistance in lifting the bed when the load is dumped.

3. The dump cart of claim 2, further comprising a strut bracket coupled between the first end of the strut and the frame.

4. The dump cart of claim 1, wherein the bed further includes a left sidewall with a plurality of vertically-oriented grooves and a right sidewall with a plurality of vertically-oriented grooves aligned with the grooves of the left sidewall, each pair of aligned grooves being configured to receive a panel.

5. The dump cart of claim 1, wherein the bed further includes a left sidewall with a plurality of slots and a right sidewall with a plurality of slots aligned with the slots of the left sidewall, each pair of aligned slots being configured to receive a bar.

6. The dump cart of claim 5, further comprising a plurality of panels, each with a plurality of channels on one surface, wherein the panels are placed on top of the bars such that each bar is received within a channel.

7. The dump cart of claim 1, wherein the bed is pivotally coupled to only one of either the left adapter rail or the right adapter rail to allow the bed to pivot sideways with respect to the bed adapter.

8. The dump cart of claim 1, wherein the frame further includes a vertically oriented shaft rotatably coupled to the frame crossmember, the shaft coupled through a support structure to the bed adapter, thereby allowing the bed adapter and the bed to rotate 360 degrees about a vertical axis with respect to the frame.

9. The dump cart of claim 1, wherein the center beam is pivotally coupled to the frame crossmember to allow the dump cart to rotate about a vertical axis with respect to the pulling vehicle.

10. A dump cart comprising:
a bed configured to carry a load, the bed including a forward end and a rear end defining opposing ends of a longitudinal axis;
a bed adapter coupled to a bottom wall of the bed, the bed adapter including a left adapter rail and a right adapter rail, each adapter rail aligned with the longitudinal axis; and
a frame including
a frame crossmember oriented transverse to the longitudinal axis, the frame crossmember including a left end coupled to a first wheel and a right end coupled to a second wheel,
a left frame rail, aligned with the longitudinal axis, rigidly coupled to the frame crossmember, and extending rearward therefrom, the left frame rail pivotally coupled to the left adapter rail at a point on the frame rail that is rearward from the frame crossmember,
a right frame rail, aligned with the longitudinal axis, rigidly coupled to the frame crossmember, and extending rearward therefrom, the right frame rail pivotally coupled to the right adapter rail at a point on the frame rail that is rearward from the frame crossmember, the right frame rail in combination with left frame rail allowing the bed to dump the load to the rear of the dump cart, and
a center beam configured to removably couple to a pulling vehicle, the center beam coupled to the frame crossmember and extending forward therefrom.

11. The dump cart of claim 10, further comprising a strut with a first end coupled to the frame and a second end coupled to the bed adapter to provide assistance in lifting the bed when the load is dumped.

12. The dump cart of claim 11, further comprising a strut bracket coupled between the first end of the strut and the frame.

13. The dump cart of claim 10, wherein the bed further includes a left sidewall with a plurality of vertically-oriented grooves and a right sidewall with a plurality of vertically-oriented grooves aligned with the grooves of the left sidewall, each pair of aligned grooves being configured to receive a panel.

14. The dump cart of claim 10, wherein the bed further includes a left sidewall with a plurality of slots and a right sidewall with a plurality of slots aligned with the slots of the left sidewall, each pair of aligned slots being configured to receive a bar.

15. The dump cart of claim 14, further comprising a plurality of panels, each with a plurality of channels on one surface, wherein the panels are placed on top of the bars such that each bar is received within a channel.

16. The dump cart of claim 10, wherein the center beam is pivotally coupled to the frame crossmember to allow the dump cart to rotate about a vertical axis with respect to the pulling vehicle.

17. A dump cart comprising:
a bed configured to carry a load;
a bed adapter configured to couple to a bottom wall of the bed, the bed adapter including a left adapter rail and a right adapter rail, both adapter rails configured to contact the bottom wall; and
a frame pivotally coupled to the bed adapter, the frame including
a frame crossmember,
a left frame rail rigidly coupled to the frame crossmember and releasably coupled to the left adapter rail,
a right frame rail rigidly coupled to the frame crossmember and releasably coupled to the right adapter rail, and
a center beam rigidly coupled to the frame crossmember and configured to removably couple to a pulling vehicle; and
a lift adapter for lifting an object external to the dump cart, the lift adapter including
a lift arm configured to releasably insert into the center beam for a user to grip while lifting the object,
a left cradle arm and a right cradle arm configured to couple to one or more features of the object,
a stabilizer leg configured to contact the ground so as to support a portion of the weight of the object,
a left lift rail configured to releasably couple to the left frame rail and a right lift rail configured to releasably couple to the right frame rail, and
a lift crossmember to which the left lift rail, the right lift rail, the left cradle arm, and the right cradle arm are rigidly coupled.

18. The dump cart of claim 17, wherein the lift adapter further includes a lift hitch coupler configured to couple to a hitch connector of the object.

19. The dump cart of claim 17, wherein the stabilizer leg is further configured to pivot with respect to the lift adapter when the stabilizer leg is not supporting a portion of the weight of the object.

20. The dump cart of claim 17, further comprising a strut with a first end coupled to the frame and a second end coupled to the bed adapter to provide assistance in lifting the bed when the load is dumped.

21. The dump cart of claim 20, further comprising a strut bracket coupled between the first end of the strut and the frame.

22. The dump cart of claim 17, wherein the bed further includes a left sidewall with a plurality of vertically-oriented grooves and a right sidewall with a plurality of vertically-oriented grooves aligned with the grooves of the left sidewall, each pair of aligned grooves being configured to receive a panel.

23. The dump cart of claim 17, wherein the bed further includes a left sidewall with a plurality of slots and a right sidewall with a plurality of slots aligned with the slots of the left sidewall, each pair of aligned slots being configured to receive a bar.

24. The dump cart of claim 23, further comprising a plurality of panels, each with a plurality of channels on one surface, wherein the panels are placed on top of the bars such that each bar is received within a channel.

25. The dump cart of claim 17, wherein the bed is pivotally coupled to only one of either the left adapter rail or the right adapter rail to allow the bed to pivot sideways with respect to the bed adapter.

26. A dump cart comprising:
a bed configured to carry a load, the bed including a forward end and a rear end defining opposing ends of a longitudinal axis;

a bed adapter coupled to a bottom wall of the bed, the bed adapter including—
  a left adapter rail and a right adapter rail, each adapter rail aligned with the longitudinal axis, and
  an adapter crossmember oriented transverse to the longitudinal axis and positioned between the left adapter rail and the right adapter rail,
  wherein the left adapter rail, the right adapter rail, and the adapter crossmember each contact the bottom wall of the bed; and
a frame including—
  a frame crossmember oriented transverse to the longitudinal axis, the frame crossmember including a left end coupled to a first wheel and a right end coupled to a second wheel, wherein the left end and the right end are each curved downward with respect to a center portion of the frame crossmember,
  a left frame rail, aligned with the longitudinal axis, rigidly coupled to the frame crossmember, and extending rearward therefrom, the left frame rail pivotally coupled to the left adapter rail at a point on the frame rail that is rearward from the frame crossmember,
  a right frame rail, aligned with the longitudinal axis, rigidly coupled to the frame crossmember, and extending rearward therefrom, the right frame rail pivotally coupled to the right adapter rail at a point on the frame rail that is rearward from the frame crossmember, the right frame rail in combination with left frame rail allowing the bed to dump the load to the rear of the dump cart,
  a center beam configured to removably couple to a pulling vehicle, the center beam coupled to the frame crossmember and extending forward therefrom, and
  a strut with a first end coupled to a bracket connected to the frame and a second end coupled to the adapter crossmember to provide assistance in lifting the bed when the load is dumped.

* * * * *